United States Patent
Wang et al.

(10) Patent No.: US 11,432,157 B2
(45) Date of Patent: Aug. 30, 2022

(54) NETWORK AUTHENTICATION METHOD, NETWORK DEVICE, AND CORE NETWORK DEVICE

(71) Applicant: Huawei International Pte. Ltd., Singapore (SG)

(72) Inventors: Haiguang Wang, Singapore (SG); Xin Kang, Singapore (SG); Zhongding Lei, Singapore (SG); Fei Liu, Singapore (SG)

(73) Assignee: Huawei International Pte. Ltd., Singapore (SG)

( * ) Notice: Subject to any disclaimer, the term of this patent is extended or adjusted under 35 U.S.C. 154(b) by 0 days.

(21) Appl. No.: 16/698,721

(22) Filed: Nov. 27, 2019

(65) Prior Publication Data
US 2020/0100105 A1    Mar. 26, 2020

Related U.S. Application Data
(63) Continuation of application No. PCT/SG2017/050273, filed on May 29, 2017.

(51) Int. Cl.
*H04W 12/06* (2021.01)
*H04W 12/00* (2021.01)
(Continued)

(52) U.S. Cl.
CPC ........ *H04W 12/71* (2021.01); *H04L 63/0876* (2013.01); *H04W 12/06* (2013.01); *H04W 12/086* (2021.01); *H04W 12/04* (2013.01)

(58) Field of Classification Search
CPC . H04W 12/06; H04W 12/08; H04W 12/0806; H04W 12/00
See application file for complete search history.

(56) References Cited

U.S. PATENT DOCUMENTS

2007/0191014 A1    8/2007  Zheng et al.
2009/0093232 A1*   4/2009  Gupta ............... H04L 63/104
                                              455/410
(Continued)

FOREIGN PATENT DOCUMENTS

CN    1848994 A    10/2006
CN    101034989 A   9/2007
(Continued)

OTHER PUBLICATIONS

"3rd Generation Partnership Project; Technical Specification Group Services and System Aspects; 3G Security; Security architecture (Release 14)," 3GPP TS 33.102 V14.1.0, pp. 1-77, 3rd Generation Partnership Project, Valbonne, France (Mar. 2017).
(Continued)

*Primary Examiner* — Jinsong Hu
*Assistant Examiner* — Farideh Madani
(74) *Attorney, Agent, or Firm* — Leydig, Voit & Mayer, Ltd.

(57) ABSTRACT

The disclosure provides a network authentication method, a network device, and a core network device, the network authentication method including: receiving, by a first network device, an access request message sent by a terminal device, where the access request message includes an identity of the terminal device; determining, by the first network device based on the identity of the terminal device, whether to allow authentication on the terminal device; if the first network device does not allow the authentication on the terminal device, sending, by the first network device, the identity of the terminal device to a core network device, so that the core network device performs network authentication based on the identity of the terminal device.

15 Claims, 15 Drawing Sheets

(51) Int. Cl.
*H04W 12/71* (2021.01)
*H04L 9/40* (2022.01)
*H04W 12/086* (2021.01)
*H04W 12/04* (2021.01)

(56) References Cited

U.S. PATENT DOCUMENTS

| | | | |
|---|---|---|---|
| 2012/0204027 A1* | 8/2012 | Baek | H04L 63/0876 713/155 |
| 2012/0297193 A1 | 11/2012 | Liu et al. | |
| 2014/0248854 A1 | 9/2014 | Schell et al. | |
| 2016/0205550 A1 | 7/2016 | Rajadurai | |
| 2016/0226869 A1* | 8/2016 | Vachiravel | G06F 21/31 |
| 2017/0201937 A1* | 7/2017 | Zhang | H04W 12/0609 |
| 2018/0176777 A1* | 6/2018 | Chen | H04W 12/06 |
| 2018/0198796 A1* | 7/2018 | Chien | H04L 45/74 |
| 2019/0386991 A1* | 12/2019 | Bischinger | H04W 4/70 |

FOREIGN PATENT DOCUMENTS

| | | |
|---|---|---|
| CN | 101296240 A | 10/2008 |
| CN | 101854629 A | 10/2010 |
| CN | 101867928 A | 10/2010 |
| CN | 1801704 B | 12/2010 |
| CN | 102325322 A | 1/2012 |
| CN | 102348209 A | 2/2012 |
| CN | 102625306 A | 8/2012 |
| CN | 102843233 A | 12/2012 |
| CN | 103188738 A | 7/2013 |
| CN | 102143491 B | 10/2013 |
| CN | 103841119 A | 6/2014 |
| CN | 104010303 A | 8/2014 |
| CN | 104640111 A | 5/2015 |
| CN | 102480727 B | 8/2015 |
| WO | 2009111522 A1 | 9/2009 |
| WO | 2009140438 A1 | 11/2009 |

OTHER PUBLICATIONS

"3rd Generation Partnership Project; Technical Specification Group Services and System Aspects; 3GPP System Architecture Evolution (SAE); Security architecture (Release 14)," 3GPP TS 33.401 V14. 2.0, pp. 1-152, 3rd Generation Partnership Project, Valbonne, France (Mar. 2017).

Deliang, "Discussion on Network Security of 4G Wireless Communication System," Information and Computer (Theoretical Edition), China Computer and Communication, Issue 10, total 3 pages (2016). With English abstract.

Gu et al., "A Green and Secure Authentication for the 4th Generation Mobile Network," 2011 Australasian Telecommunication Networks and Applications Conference (ATNAC), total 7 pages (Dec. 8, 2011).

* cited by examiner

NETWORK AUTHENTICATION METHOD, NETWORK DEVICE, AND CORE NETWORK DEVICE

CROSS-REFERENCE TO RELATED APPLICATIONS

This application is a continuation of International Application No. PCT/SG2017/050273, filed on May 29, 2017, the disclosure of which is hereby incorporated by reference in its entirety.

TECHNICAL FIELD

This application relates to the field of communications technologies, and in particular, to a network authentication method, a network device, and a core network device.

BACKGROUND

Internet of things (IoT) is an important application scenario of a 5th generation mobile communications technology (5G). Network authentication is required when a terminal device in the IoT accesses a 5G network. FIG. 1 is a schematic interaction diagram of network authentication performed by a terminal device in the prior art. An authentication process is as follows.

Step S101: The terminal device sends a network access request to a mobility management entity (MME). Step S102: The MME sends a network access data request to a home subscriber server (HSS). Step S103: The HSS receives the network access data request, and determines a symmetric key K corresponding to the terminal device. The symmetric key is stored on the HSS, and then an authentication vector is calculated based on the symmetric key K, where the authentication vector includes an authentication token (AUTNHSS), an expected response (XRES), and an access security management key (KASME). Step S104: The HSS sends the authentication vector to the MME. Step S105: The MME receives and stores the authentication vector. Step S106: The MME initiates a user authentication request to the terminal device, where the user authentication request includes a random number RAND, the AUTNHSS, and the KASME. Step S107: The terminal device receives the RAND and the AUTNHSS, and performs an operation by using an authentication and key agreement protocol (AKA) key derivation algorithm of a 3rd mobile communications network in an evolved packet system (EPS). Input parameters of the operation include the symmetric key K of the terminal device, the RAND, a serving network (SN) identifier, and a sequence number (SQN) of the terminal device; and output parameters of the operation include the user-side authentication token AUTNUE, a response (RES), and the KASME. Step S108: When determining that the AUTNUE and the AUTNHSS are the same, the terminal device generates a session key between the terminal device and a network side based on the KASME. Step S109: The terminal device sends the RES obtained through the calculation to the MME. Step S110: The MME receives the RES, and generates a session key between the network side and the terminal device based on the KASME when determining that the received RES is the same as the XRES in the authentication vector.

Currently, in the IoT, a huge quantity of terminal devices need to perform network authentication with an HSS. Therefore, the HSS needs to store a symmetric key and an SQN that are corresponding to each terminal device. This centralized storage causes heavy load pressure on the HSS. In addition, the network authentication process can only be implemented through interaction among the terminal device, the MME, and the HSS. In this case, problems that a network authentication chain is relatively long and network authentication efficiency is affected are caused. To resolve the two technical problems, a distributed network authentication method is used in the prior art. In other words, a network authentication process is implemented between a network device and a terminal device in an access network or a core network. However, when both a network device and a core network device in a communications network have a network authentication function, how to perform network authentication becomes a problem to be resolved in this application.

SUMMARY

This application provides a network authentication method, a network device, and a core network device. In a case in which both the network device and the core network device have a network bidirectional authentication function, a problem of how to perform network authentication can be effectively resolved by using the method.

According to a first aspect, this application provides a network authentication method. The method includes: receiving, by a first network device, an access request message sent by a terminal device, where the access request message includes an identity of the terminal device; determining, by the first network device based on the identity of the terminal device, whether to allow authentication on the terminal device; if the first network device does not allow the authentication on the terminal device, sending, by the first network device, the identity of the terminal device to a core network device, so that the core network device performs network authentication based on the identity of the terminal device; and if the first network device allows the authentication on the terminal device, sending, by the first network device, an authentication request message to the terminal device, so that the terminal device performs authentication on the first network device based on the authentication request message; and receiving an authentication response message sent by the terminal device and performing authentication on the terminal device based on the authentication response message.

A problem of how to perform network authentication can be effectively resolved by using this method. Further, the terminal device is enabled to perform network authentication with a proximate device as much as possible by using this method. For example, an access network gateway, a base station, and a mobility management entity-authentication unit (MME-AU) are all disposed in an access network, and compared with the core network device, the access network gateway, the base station, and the MME-AU may be referred to as proximate devices of the terminal device. Although an authentication security element (AUSF) is disposed in a core network, it is considered that compared with core network devices such as an HSS, an AUC server, and an ARPF server, the AUSF is disposed more dispersedly. Therefore, compared with the core network devices such as the HSS, the AUC server, and the ARPF server, the AUSF may also be referred to as a proximate device of the terminal device. In conclusion, the terminal device is enabled to perform network authentication with a proximate device as much as possible by using this method, so that network authentication efficiency can be improved while reliability of network authentication is ensured.

Optionally, the determining, by the first network device based on the identity of the terminal device, whether to allow authentication on the terminal device includes: determining, by the first network device based on the identity of the terminal device, whether the terminal device is an internet of things (IoT) device.

Certainly, the terminal device may alternatively be classified in another manner based on an ID of the terminal device. This is not limited in this application. Therefore, in this application, that the first network device determines, based on the identity of the terminal device, whether to allow the authentication on the terminal device is not limited herein.

Optionally, if the first network device allows the authentication on the terminal device, before the sending, by the first network device, an authentication request message to the terminal device, the method further includes: determining, by the first network device, whether a local blacklist includes the identity of the terminal device; and correspondingly, the sending, by the first network device, an authentication request message to the terminal device includes: if the first network device determines that the local blacklist does not include the identity of the terminal device, sending, by the first network device, the authentication request message to the terminal device.

By using the method, before performing network authentication, the first network device may first select the terminal device, thereby reducing unnecessary overheads of the first network device.

Optionally, after the performing authentication on the terminal device based on the authentication response message, the method further includes: determining, by the first network device, whether a local whitelist includes the identity of the terminal device; and if the first network device determines that the local whitelist does not include the identity of the terminal device, sending, by the first network device, the identity of the terminal device to the core network device, so that the core network device verifies validity of the identity of the terminal device.

In other words, if the first network device determines that the local whitelist includes the identity of the terminal device, it indicates that the identity of the terminal device is valid.

Optionally, the determining, by the first network device based on the identity of the terminal device, whether to allow authentication on the terminal device includes: determining, by the first network device, whether a local whitelist includes the identity of the terminal device.

In other words, if the local whitelist includes the identity of the terminal device, it indicates that the first network device allows the authentication on the terminal device. Otherwise, it indicates that the first network device does not allow the authentication on the terminal device.

Optionally, before the determining, by the first network device, whether the local whitelist includes the identity of the terminal device, the method further includes: determining, by the first network device, whether a local blacklist includes the identity of the terminal device; and correspondingly, the determining, by the first network device, whether a local whitelist includes the identity of the terminal device includes: if the first network device determines that the local blacklist does not include the identity of the terminal device, determining, by the first network device, whether the local whitelist includes the identity of the terminal device.

By using the method, before performing network authentication, the first network device may first select the terminal device, thereby reducing unnecessary overheads of the first network device.

Optionally, when the first network device is an access network gateway, after the performing authentication on the terminal device based on the authentication response message, the method further includes: sending, by the first network device, a security mode command to the terminal device; receiving, by the first network device, a security mode complete command sent by the terminal device; sending, by the first network device, an access security management key to the core network device and a base station that is connected to the terminal device; and sending, by the first network device, an attach complete message to the terminal device.

Optionally, when the first network device is a base station, after the performing authentication on the terminal device based on the authentication response message, the method further includes: sending, by the first network device, an access security management key to the core network device.

Optionally, when the first network device is a mobility management entity-authentication unit MME-AU or an authentication security unit AUSF, after the performing authentication on the terminal device based on the authentication response message, the method further includes: sending, by the first network device, an access security management key to the core network device and a base station that is connected to the terminal device.

Optionally, the method further includes: receiving, by the first network device, an update request message sent by the core network device, where the update request message includes the identity of the terminal device; adding, by the first network device, the identity of the terminal device to the local whitelist; and sending, by the first network device, an update response message to the core network device.

By using the method, the terminal device is enabled to perform network authentication with the first network device next time, and does not need to perform network authentication with the core network device. In this way, network authentication efficiency is improved.

According to a second aspect, this application provides a network authentication method. The method includes: receiving, by a core network device, an identity of a terminal device sent by a first network device; sending, by the core network device, an authentication request message to the terminal device based on the identity of the terminal device, so that the terminal device performs authentication on the core network device based on the authentication request message; and receiving, by the core network device, an authentication response message sent by the terminal device and performing authentication on the terminal device based on the authentication response message.

In a case in which both the first network device and the core network device have a network bidirectional authentication function, when the first network device cannot perform network authentication, the core network device may perform network authentication with the terminal device by using this method, thereby improving reliability of a communications network.

Optionally, before the sending, by the core network device, an authentication request message to the terminal device based on the identity of the terminal device, the method further includes: determining, by the core network device, whether the identity of the terminal device is in a global whitelist; if the core network device determines that the identity of the terminal device is not in the global whitelist, verifying, by the core network device, validity of the identity of the terminal device; and correspondingly, the sending, by the core network device, an authentication request message to the terminal device based on the identity of the terminal device includes: when the identity of the terminal device is in the global whitelist or the identity of the terminal device is valid, sending, by the core network device, an authentication request message to the terminal device based on the identity of the terminal device. In this way, reliability of a communications network is improved.

Optionally, the method further includes: if the identity of the terminal device is valid, storing, by the core network device, a correspondence between the terminal device and the first network device in the global whitelist; sending, by the core network device, an update request message to the first network device, where the update request message includes the identity of the terminal device, so that the first network device adds the identity of the terminal device to a local whitelist; and receiving, by the core network device, an update response message sent by the first network device.

By using the method, the terminal device is enabled to perform network authentication with the first network device next time, and does not need to perform network authentication with the core network device. In this way, network authentication efficiency is improved.

Optionally, the method further includes: if the core network device determines that the identity of the terminal device is in the global whitelist, determining, by the core network device in the global whitelist, an identity of a second network device corresponding to the identity of the terminal device; sending, by the core network device, a deletion request message to the second network device, where the deletion request message includes the identity of the terminal device, so that the second network device deletes the identity of the terminal device from a local whitelist; receiving, by the core network device, a deletion response message sent by the second network device; updating, by the core network device, a correspondence that is between the terminal device and the second network device and that is in the global whitelist to a correspondence between the terminal device and the first network device; sending, by the core network device, an update request message to the first network device, where the update request message includes the identity of the terminal device, so that the first network device adds the identity of the terminal device to the local whitelist; and receiving, by the core network device, an update response message sent by the first network device.

By using the method, the terminal device is enabled to perform network authentication with the network device after handover next time, in other words, perform network authentication with the first network device, and does not need to perform network authentication with the core network device. In this way, network authentication efficiency is improved.

Optionally, the method further includes: receiving, by the core network device, an access security management key sent by the first network device.

The following describes a network device. The network device may be configured to execute the first aspect and the optional manners corresponding to the first aspect. Implementation principles and technical effects of the network device are similar, and details are not described herein again.

According to a third aspect, this application provides a network device. The network device includes: a receiver, a processor, a transmitter, and a memory, where the memory is configured to store code, and when the code is run by the processor, the processor is enabled to implement the following functions; the receiver is configured to receive an access request message sent by a terminal device, where the access request message includes an identity of the terminal device; the processor is configured to determine, based on the identity of the terminal device, whether to allow authentication on the terminal device; the transmitter is configured to: if the network device does not allow the authentication on the terminal device, send the identity of the terminal device to a core network device, so that the core network device performs network authentication based on the identity of the terminal device; and the transmitter is further configured to: if the network device allows the authentication on the terminal device, send an authentication request message to the terminal device, so that the terminal device performs authentication on the network device based on the authentication request message; the receiver is further configured to receive an authentication response message sent by the terminal device; and the processor is further configured to perform authentication on the terminal device based on the authentication response message.

Optionally, the processor is specifically configured to determine, based on the identity of the terminal device, whether the terminal device is an internet of things IoT device.

Optionally, the processor is further configured to determine whether a local blacklist includes the identity of the terminal device; and correspondingly, the transmitter is specifically configured to: if the processor determines that the local blacklist does not include the identity of the terminal device, send an authentication request message to the terminal device.

Optionally, the processor is further configured to determine whether a local whitelist includes the identity of the terminal device; and the transmitter is further configured to: if the processor determines that the local whitelist does not include the identity of the terminal device, send the identity of the terminal device to the core network device, so that the core network device verifies validity of the identity of the terminal device.

Optionally, the processor is specifically configured to determine whether the local whitelist includes the identity of the terminal device.

Optionally, the processor is further configured to determine whether a local blacklist includes the identity of the terminal device; and correspondingly, the processor is specifically configured to: if it is determined that the local blacklist does not include the identity of the terminal device, determine whether the local whitelist includes the identity of the terminal device.

Optionally, when the network device is an access network gateway, the transmitter is further configured to send a security mode command to the terminal device; the receiver is further configured to receive a security mode complete command sent by the terminal device; the transmitter is further configured to send an access security management key to the core network device and a base station that is connected to the terminal device; and the transmitter is further configured to send an attach complete message to the terminal device.

Optionally, when the network device is a base station, the transmitter is further configured to send the access security management key to the core network device.

Optionally, when the network device is a mobility management entity-authentication unit MME-AU or an authentication security unit AUSF, the transmitter is further configured to send the access security management key to the core network device and a base station that is connected to the terminal device.

Optionally, the receiver is further configured to receive an update request message sent by the core network device, where the update request message includes the identity of the terminal device; the processor is further configured to add the identity of the terminal device to the local whitelist; and the transmitter is further configured to send an update response message to the core network device.

The following describes a core network device. The core network device may be configured to execute the second aspect and the optional manners corresponding to the second aspect. Implementation principles and technical effects of the core network device are similar, and details are not described herein again.

According to a fourth aspect, this application provides a core network device. The core network device includes: a receiver, configured to receive an identity of a terminal device sent by a first network device; a transmitter, configured to send an authentication request message to the terminal device based on the identity of the terminal device, so that the terminal device performs authentication on the core network device based on the authentication request message; and the receiver is further configured to: receive an authentication response message sent by the terminal device and perform authentication on the terminal device based on the authentication response message.

Optionally, the core network device further includes a processor and a memory, the memory is configured to store code, and when the code is run by the processor, the processor is enabled to: determine whether the identity of the terminal device is in a global whitelist; and if it is determined that the identity of the terminal device is not in the global whitelist, verify validity of the identity of the terminal device; and correspondingly, the transmitter is specifically configured to: when the identity of the terminal device is in the global whitelist or the identity of the terminal device is valid, send the authentication request message to the terminal device based on the identity of the terminal device.

Optionally, the processor is further configured to: if the identity of the terminal device is valid, store a correspondence between the terminal device and the first network device in the global whitelist; the transmitter is configured to send an update request message to the first network device, where the update request message includes the identity of the terminal device, so that the first network device adds the identity of the terminal device to the local whitelist; and the receiver is further configured to receive an update response message sent by the first network device.

Optionally, the processor is further configured to: if it is determined that the identity of the terminal device is in the global whitelist, determine, in the global whitelist, an identity of a second network device corresponding to the identity of the terminal device; the transmitter is further configured to send a deletion request message to the second network device, where the deletion request message includes the identity of the terminal device, so that the second network device deletes the identity of the terminal device from a local whitelist; the receiver is further configured to receive a deletion response message sent by the second network device; the processor is further configured to update a correspondence that is between the terminal device and the second network device and that is in the global whitelist to a correspondence between the terminal device and the first network device; the transmitter is further configured to send an update request message to the first network device, where the update request message includes the identity of the terminal device, so that the first network device adds the identity of the terminal device to the local whitelist; and the receiver is further configured to receive an update response message sent by the first network device.

Optionally, the receiver is further configured to receive an access security management key sent by the first network device.

According to a fifth aspect, this application provides a computer storage medium, configured to store a computer software instruction used by the foregoing network device, including a program designed to execute the foregoing first aspect.

According to a sixth aspect, an embodiment of this application provides a computer storage medium, configured to store a computer software instruction used by the foregoing core network device, including a program designed to execute the foregoing second aspect.

According to a seventh aspect, this application provides a computer program product, including an instruction. When the computer program is executed by a computer, the instruction enables the computer to perform functions performed by the network device in the foregoing first aspect and the optional method.

According to an eighth aspect, this application provides a computer program product, including an instruction. When the computer program is executed by a computer, the instruction enables the computer to perform functions performed by the core network device in the second aspect and the optional method.

In conclusion, this application provides a network authentication method, a network device, and a core network device. In a case in which both the network device and the core network device have a network bidirectional authentication function, a problem of how to perform network authentication can be effectively resolved. Further, the terminal device is enabled to perform network authentication with a proximate device as much as possible by using this method. For example, an access network gateway, a base station, and an MME-AU are all disposed in an access network, and compared with the core network device, the access network gateway, the base station, and the MME-AU may be referred to as proximate devices of the terminal device. Although an AUSF is disposed in a core network, it is considered that compared with core network devices such as an HSS, an AUC server, and an ARPF server, the AUSF is disposed more dispersedly. Therefore, compared with the core network devices such as the HSS, the AUC server, and the ARPF server, the AUSF may also be referred to as a proximate device of the terminal device. In conclusion, the terminal device is enabled to perform network authentication with a proximate device as much as possible by using this method, so that network authentication efficiency can be improved while reliability of network authentication is ensured.

BRIEF DESCRIPTION OF DRAWINGS

FIG. 8A-1 and FIG. 8A-2 and FIG. 8B-1 and FIG. 8B-2 are interaction flowcharts of a network authentication method according to another embodiment of this application;

FIG. 9A-1 and FIG. 9A-2 and FIG. 9B-1 and FIG. 9B-2 are interaction flowcharts of a network authentication method according to still another embodiment of this application;

DESCRIPTION OF EMBODIMENTS

A network device in this application is a device that can perform network authentication with a terminal device. The network device may be an access network device, for example, may be a base transceiver station (BTS) in global system for mobile communications (GSM) or code division multiple access (CDMA), or may be a NodeB (NB) in wideband code division multiple access (WCDMA), or may be an evolved NodeB (ENB), an access point (AP), or a relay station in a long term evolution (LTE) network, or may be a base station in a 5G network or a new-generation radio access technology (NR), or may be an access network gateway in an access network, or a mobility management entity-authentication unit (MME-AU) in the access network, which is not limited herein. The network device may also be a core network device, for example, may be an authentication security element (AUSF).

Specifically, the foregoing network device is specifically described with reference to the following several network architectures. It should be noted that this application is not limited to the following several network architectures.

Figure 2:
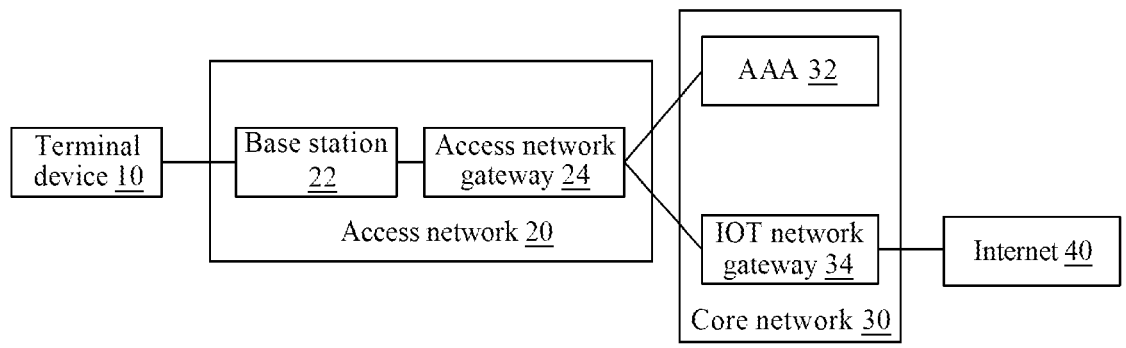
FIG. 2 is a schematic diagram of a network architecture according to an embodiment of this application.

FIG. 2 is a schematic diagram of a network architecture, according to an embodiment of this application. As shown in FIG. 2, the network architecture is a partial architectural diagram of a 3rd generation (3G) cellular network. The network architecture includes a terminal device 10, an access network 20, a core network 30, and the Internet 40. The access network 20 includes a base station 22 and an access network gateway 24. The core network 30 includes an authentication, authorization, and accounting (AAA) server 32 and an IoT network gateway 34. An access network gateway 24 may serve as the foregoing network device, and may implement network authentication with the terminal device 10. Alternatively, a base station 22 may serve as the foregoing network device, and may implement network authentication with the terminal device 10.

Figure 3:
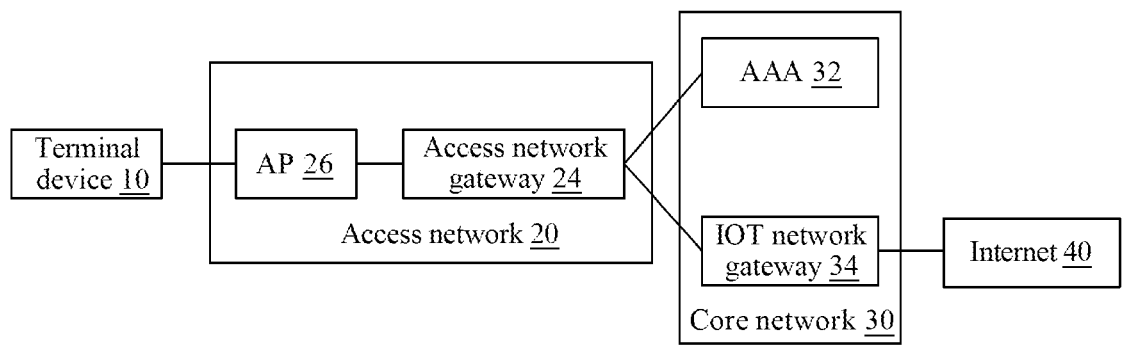
FIG. 3 is a schematic diagram of a network architecture according to another embodiment of this application.

FIG. 3 is a schematic diagram of a network architecture, according to another embodiment of this application. As shown in FIG. 3, the network architecture is a partial architectural diagram of a wireless fidelity (Wi-Fi) network. The network architecture includes a terminal device 10, an access network 20, a core network 30, and the Internet 40. The access network 20 includes an access point 26 and an access network gateway 24. The core network 30 includes a AAA server 32 and an IoT network gateway 34. Being the same as that in the foregoing 3G network architecture, in this case, an access network gateway 24 may serve as the foregoing network device, and may implement network authentication with the terminal device 10. Alternatively, an access point (AP) 26 may serve as the foregoing network device, and may implement network authentication with the terminal device 10.

Figure 4:
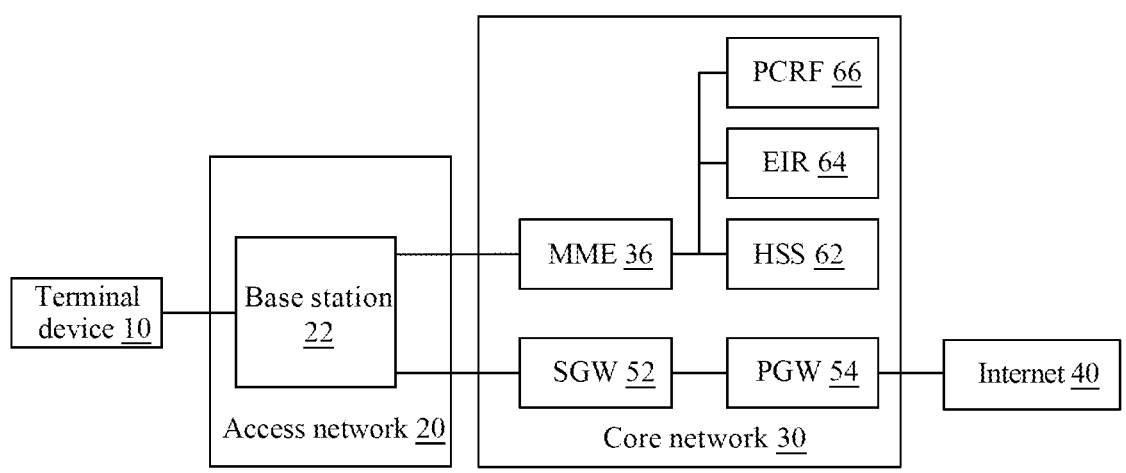
FIG. 4 is a schematic diagram of a network architecture according to still another embodiment of this application.

FIG. 4 is a schematic diagram of a network architecture, according to still another embodiment of this application. As shown in FIG. 4, the network architecture is a partial architectural diagram of a 4th generation (4G) LTE network. The network architecture includes a terminal device 10, an access network 20, a core network 30, and the Internet 40. The access network 20 includes a base station 22. The core network 30 includes a mobility management entity (MME) 36 connected to a home subscriber server (HSS) 62, an equipment identity register (EIR) 64, and a policy and charging rules function (PCRF) 66. The core network 30 also includes a serving gateway (SGW) 52 connected to a packet data network (PDN) gateway (PGW) 54. A base station 28 may serve as the foregoing network device, and may implement network authentication with the terminal device 10. Alternatively, a manner in the network architecture may be the same as that in the foregoing 3G network architecture. In other words, an access network gateway 24 is added in the 4G network architecture. In this case, the access network gateway 24 may serve as the foregoing network device, and may implement network authentication with the terminal device 10.

Figure 5:
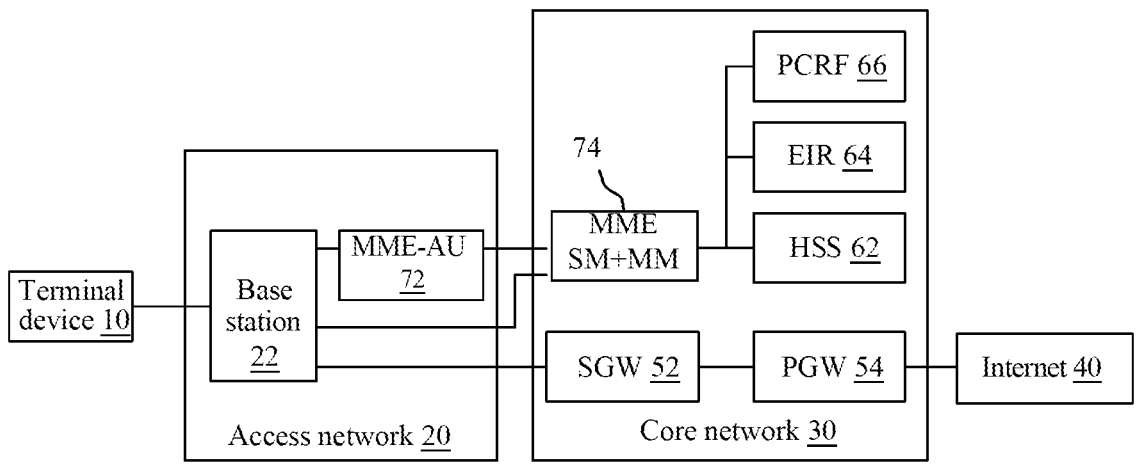
FIG. 5 is a schematic diagram of a network architecture according to yet another embodiment of this application.

FIG. 5 is a schematic diagram of a network architecture according to yet another embodiment of this application. As shown in FIG. 5, the network architecture is a partial architectural diagram of a 4G LTE network. The network architecture includes a terminal device 10, an access network 20, a core network 30, and the Internet 40. The access network 20 includes a base station 22 and a mobility management entity-authentication unit (MME-AU) 72. The core network 30 includes a session management network element (SM) and a mobility management (MM) network element integrated into one network device 74 that is connected to a HSS 62, an EIR 64, and a PCRF 66. The core network 30 also includes a SGW 52 connected to a PGW 54. An MME-AU 72 may serve as the foregoing network device, and may implement network authentication with the terminal device 10. It should be noted that a session management network element (SM) and a mobility management (MM) network element may be integrated into one network device 74 in the core network 30, and the MME-AU 72 is an independent network device, and is disposed in an access network.

Figure 6:
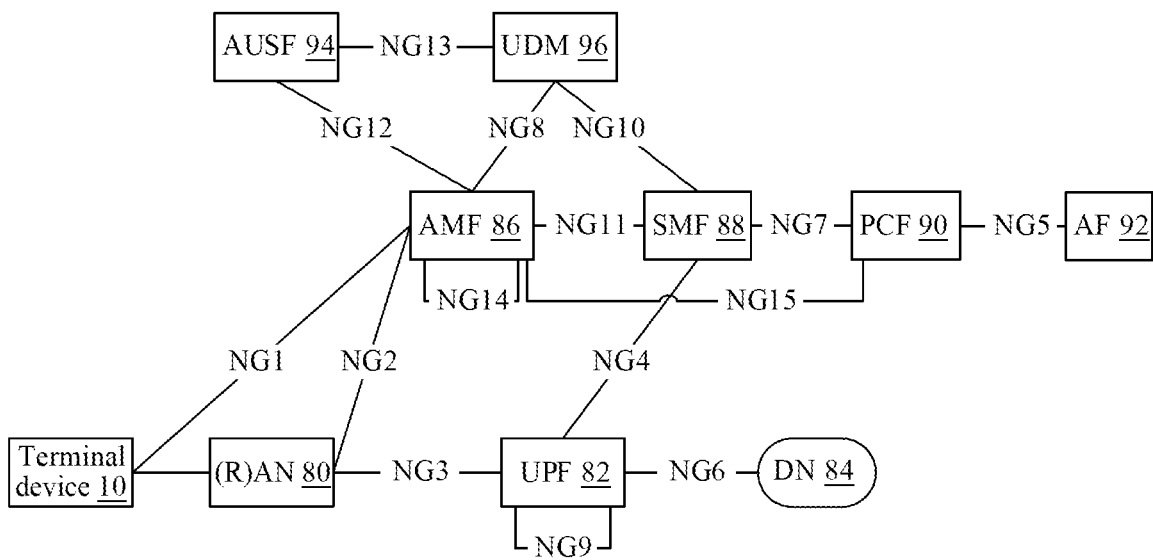
FIG. 6 is a schematic diagram of a network architecture according to still yet another embodiment of this application.

FIG. 6 is a schematic diagram of a network architecture according to still yet another embodiment of this application. As shown in FIG. 6, the network architecture is a partial architectural diagram of a 5G network. The network architecture includes a terminal device 10, a (radio) access network ((R)AN) 80, a user plane function (UPF) 82, a data network (DN) 84, an access and mobility management function (AMF) 86, a session management function (SMF) 88, a policy control function (PCF) 90, an application function (AF) 92, an authentication server function (AUSF) 94, and a unified data management (UDM) 96. The AUSF 94 may serve as the foregoing network device, and may implement network authentication with the terminal device 10.

The core network device in this application has a network authentication function. The core network device may be an authentication center (AUC) server in a 3G network, an HSS in a 4G network, an authentication credential repository and processing function (ARPF) server in a 5G network, or the like.

To resolve the following problems in the prior art, in a communications network system, both the network device and the core network device have a network authentication function. Therefore, how to perform network authentication becomes an urgent problem to be resolved. This application provides a network authentication method, a network device, and a core network device.

Figure 7:
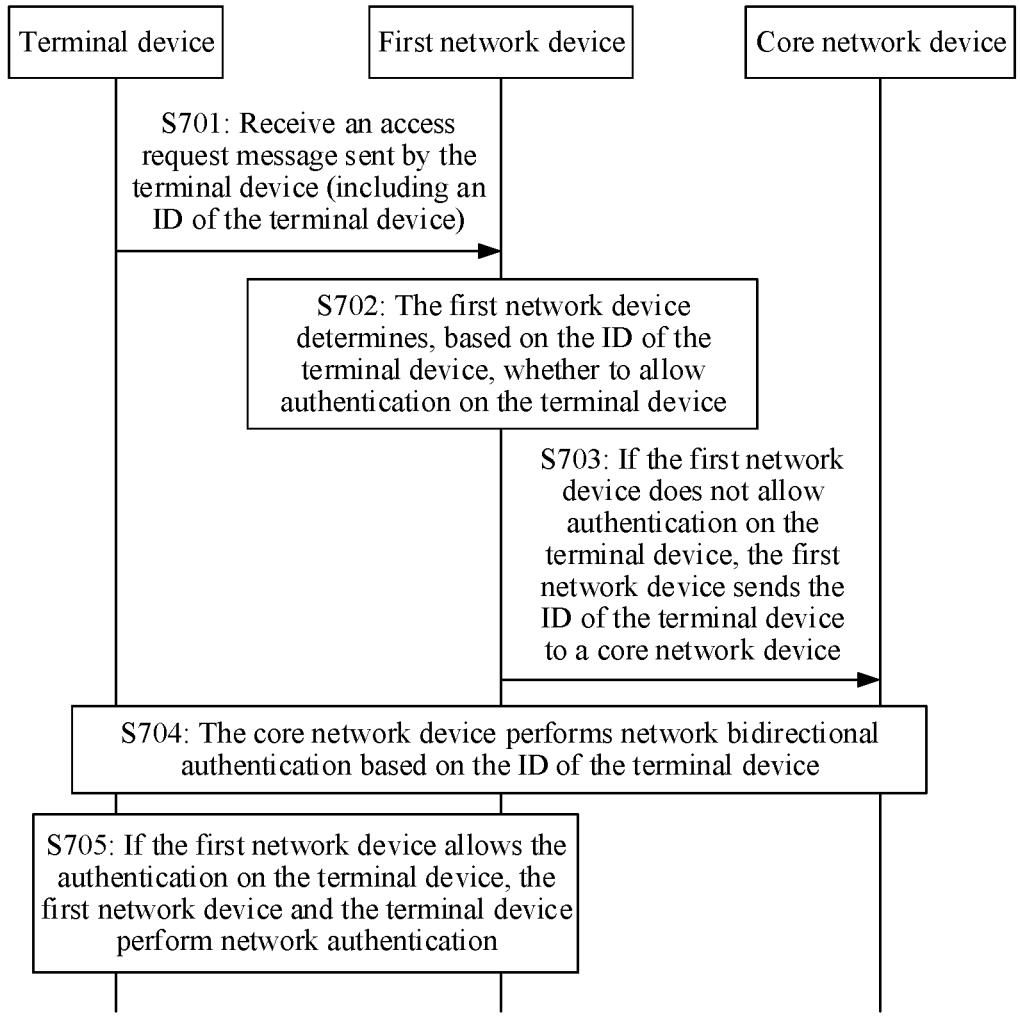
FIG. 7 is an interaction flowchart of a network authentication method according to an embodiment of this application.
Figures 1, 8A:
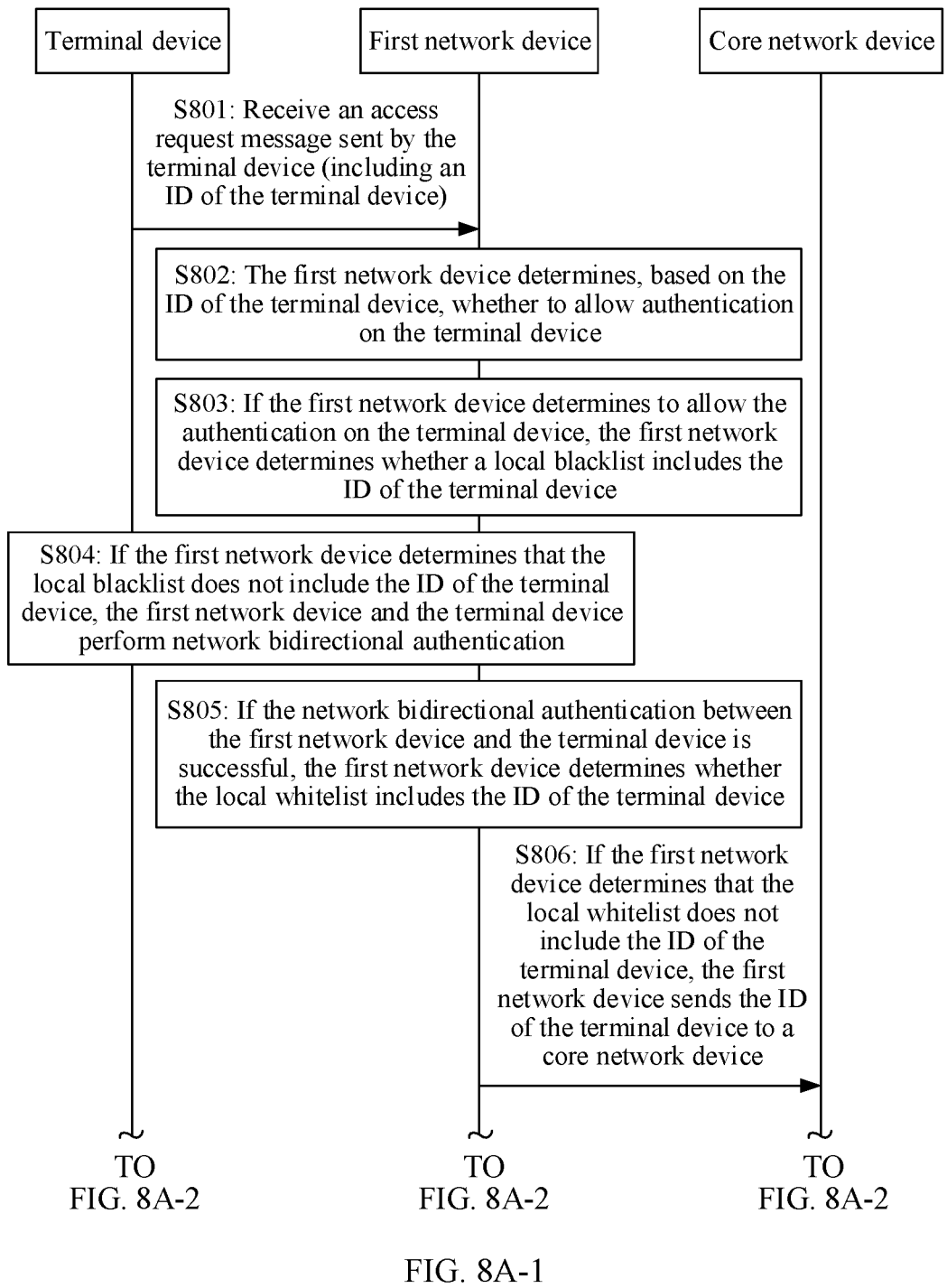
Figures 2, 8A:
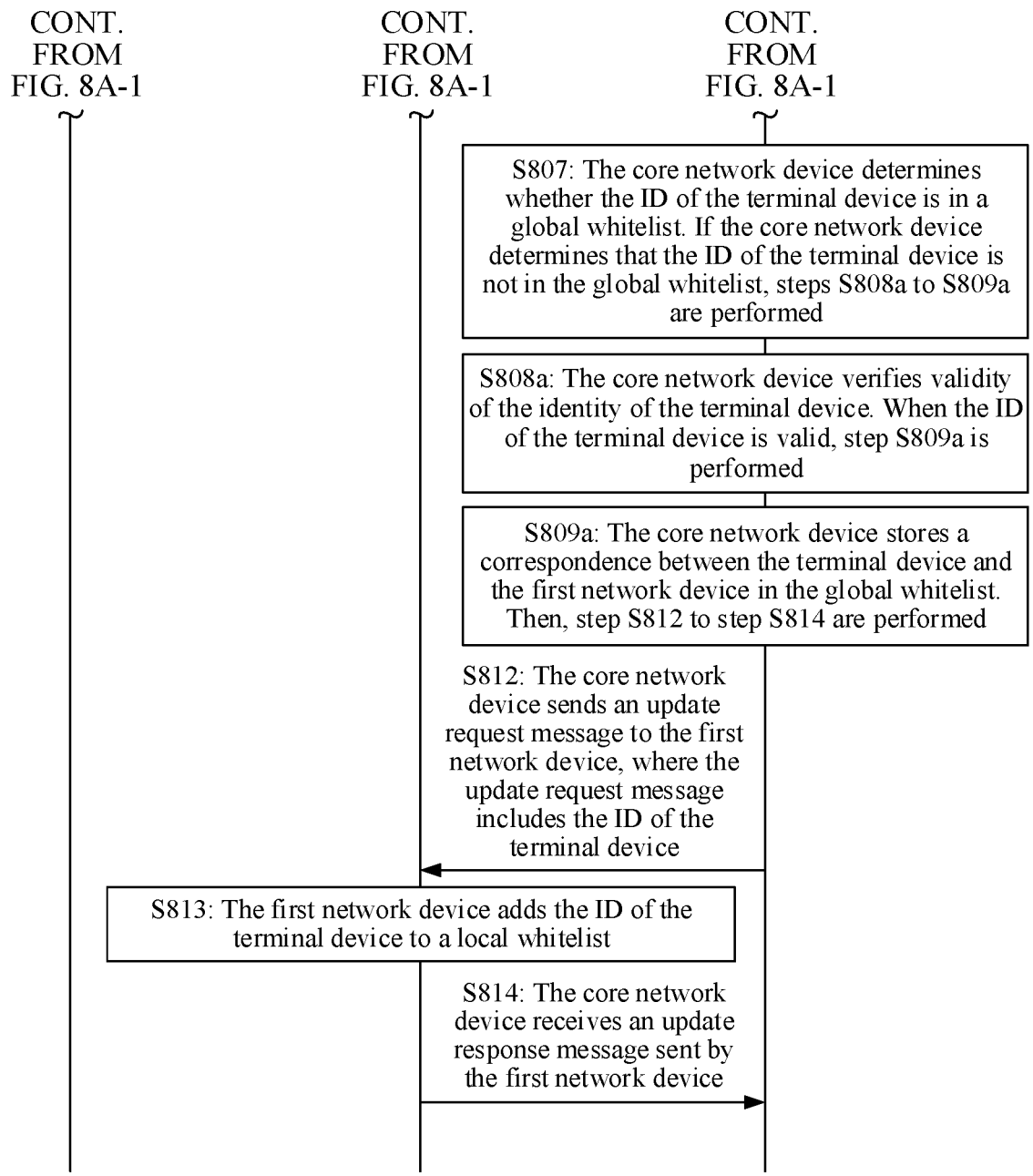
Figures 1, 8B:
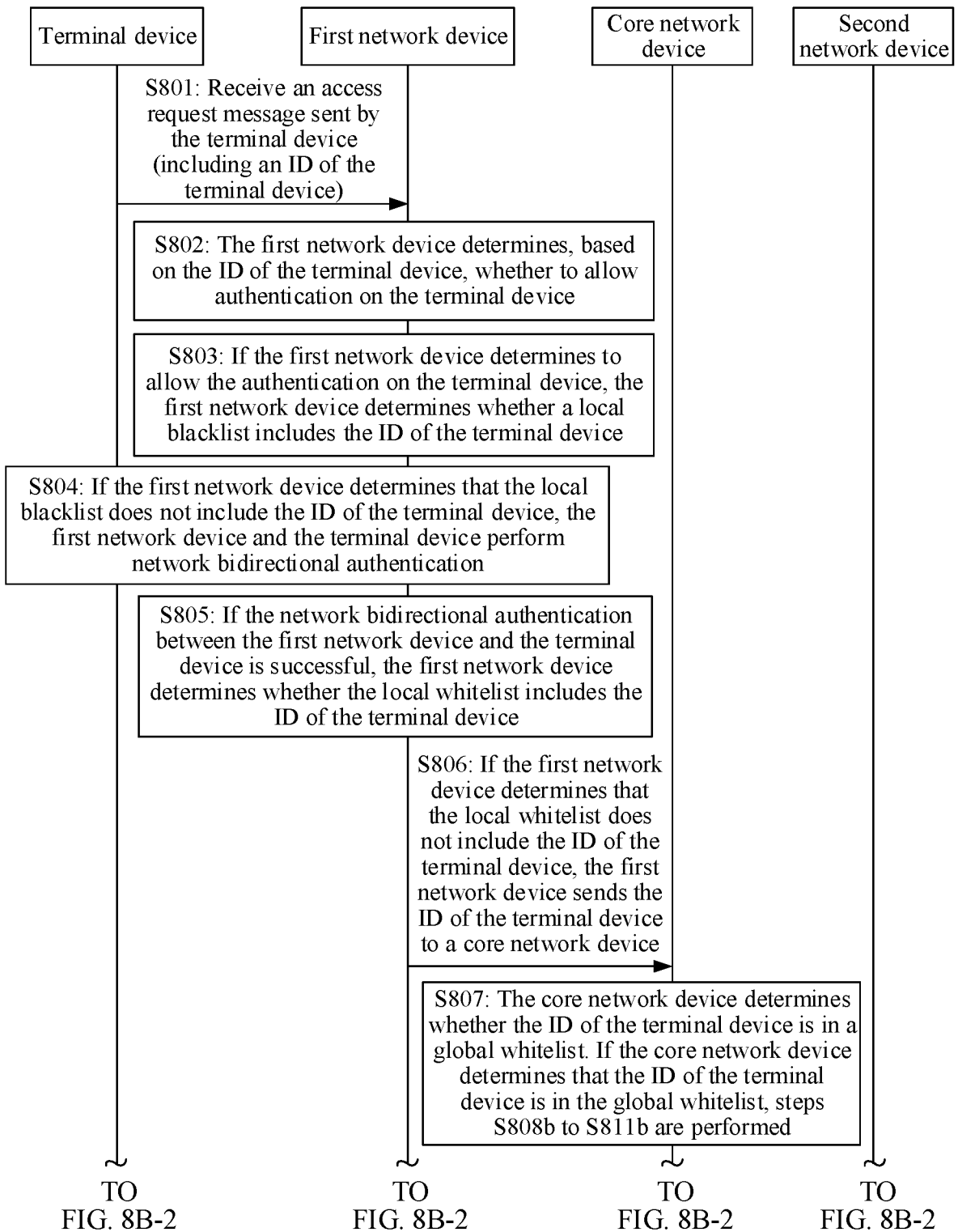
Figures 2, 8B:
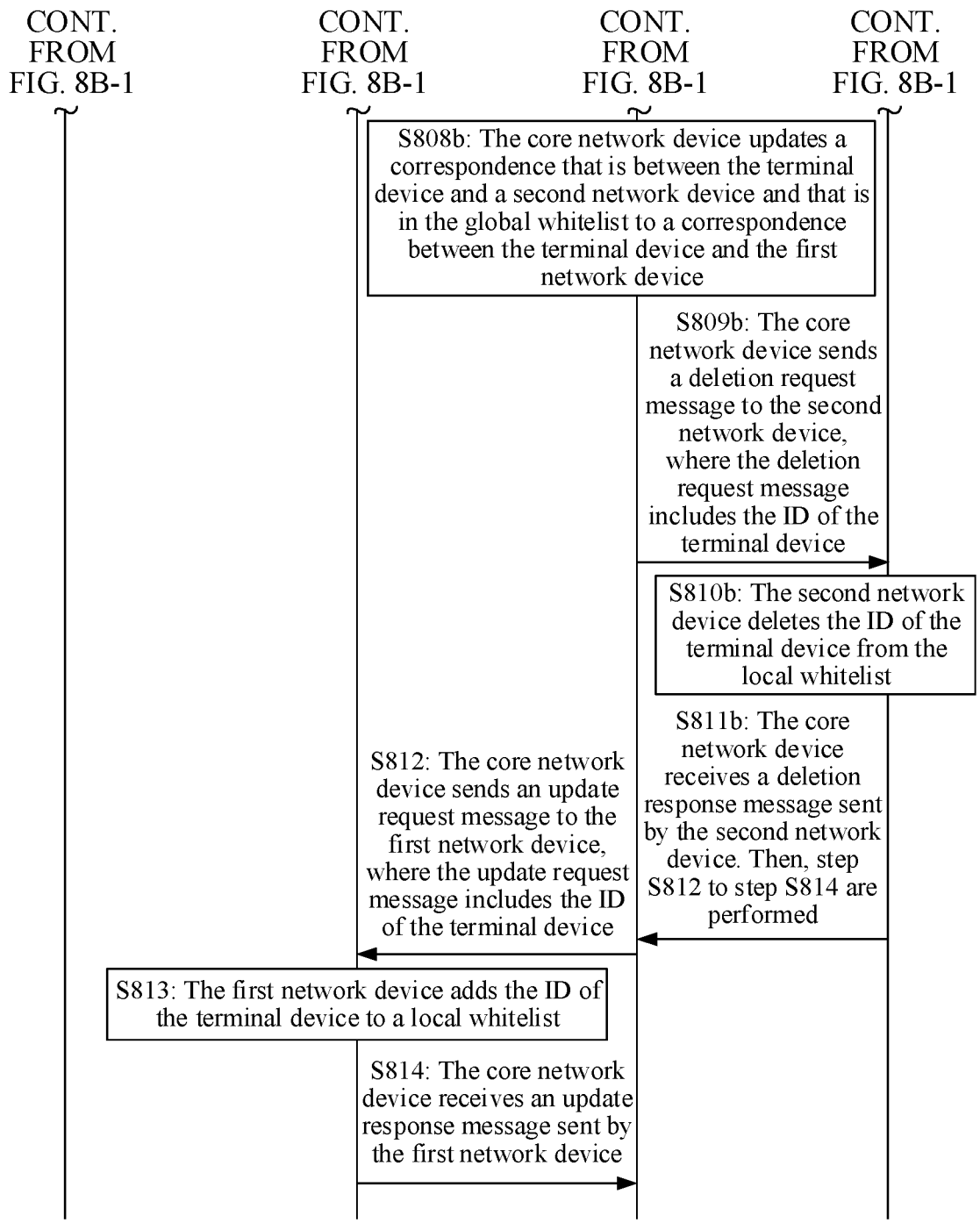
Figures 1, 9A:
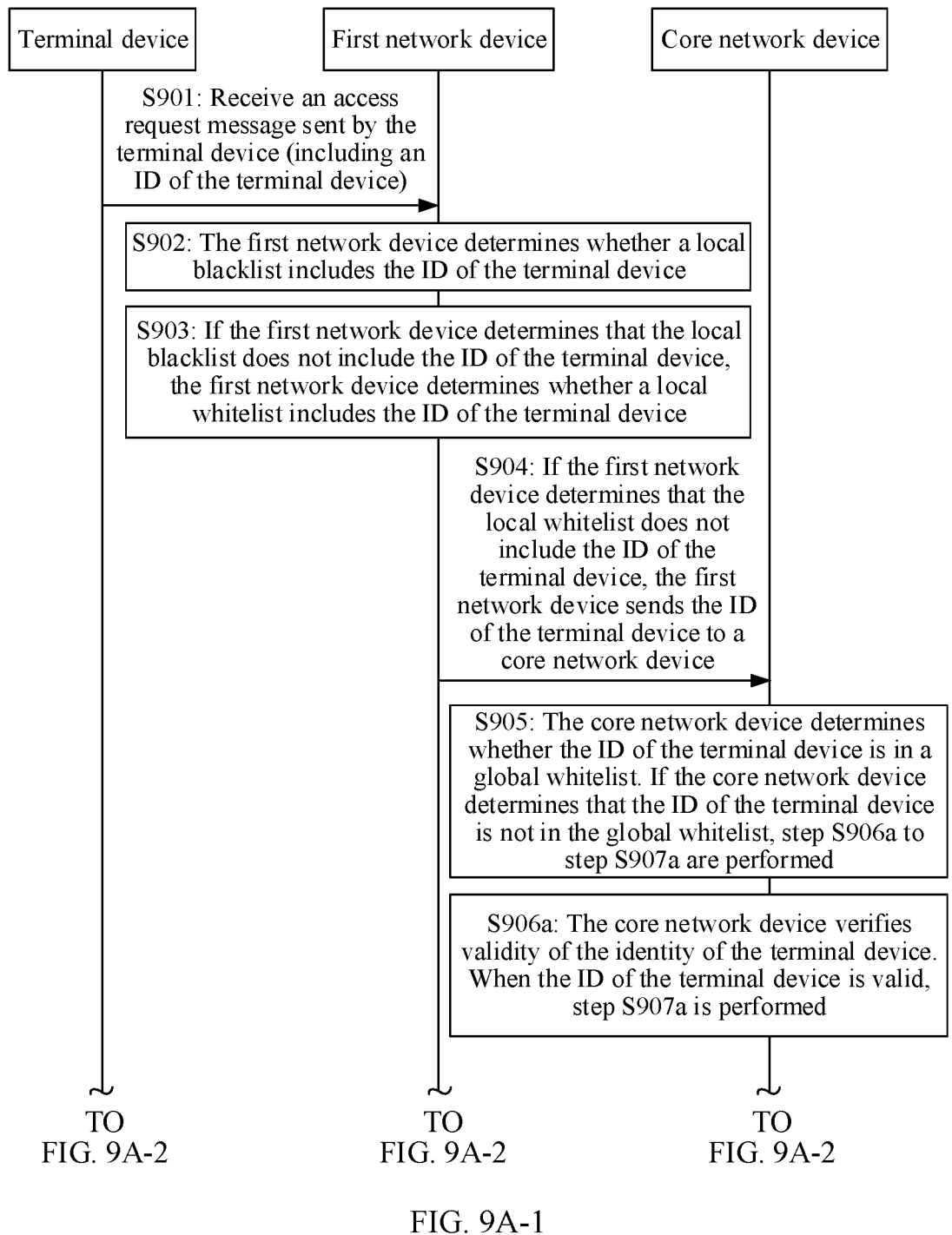
Figures 2, 9A:
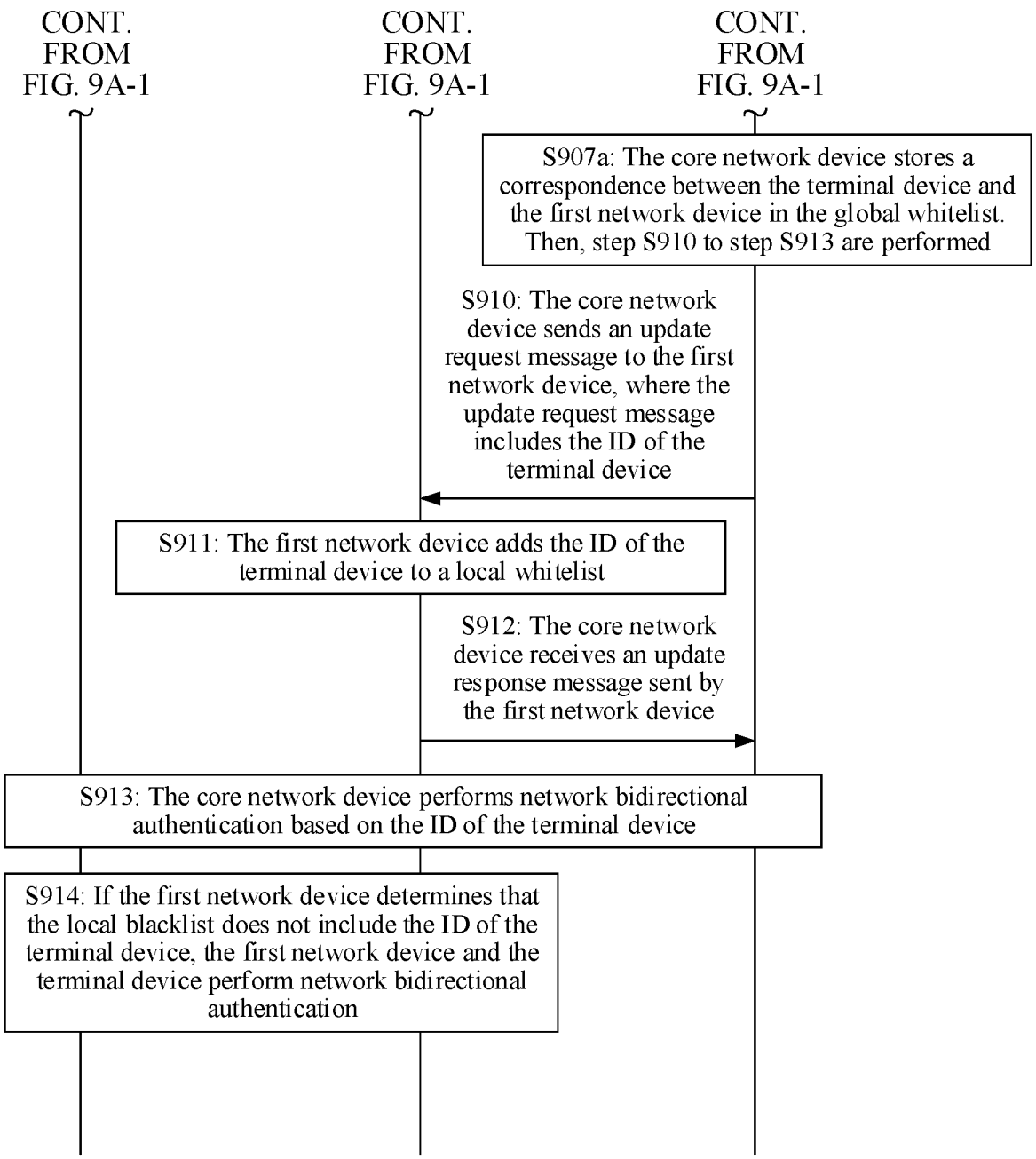
Figures 1, 9B:
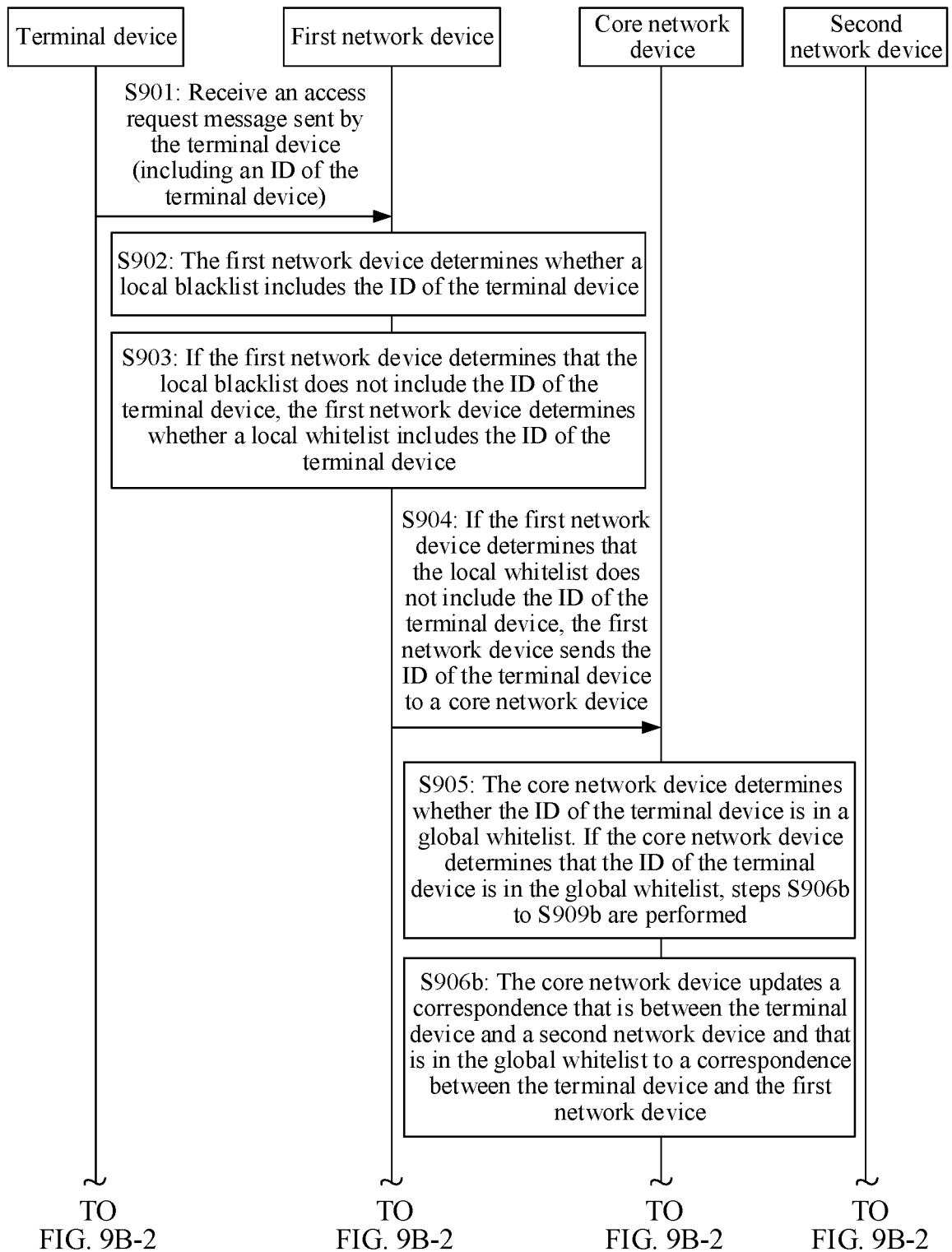
Figures 2, 9B:
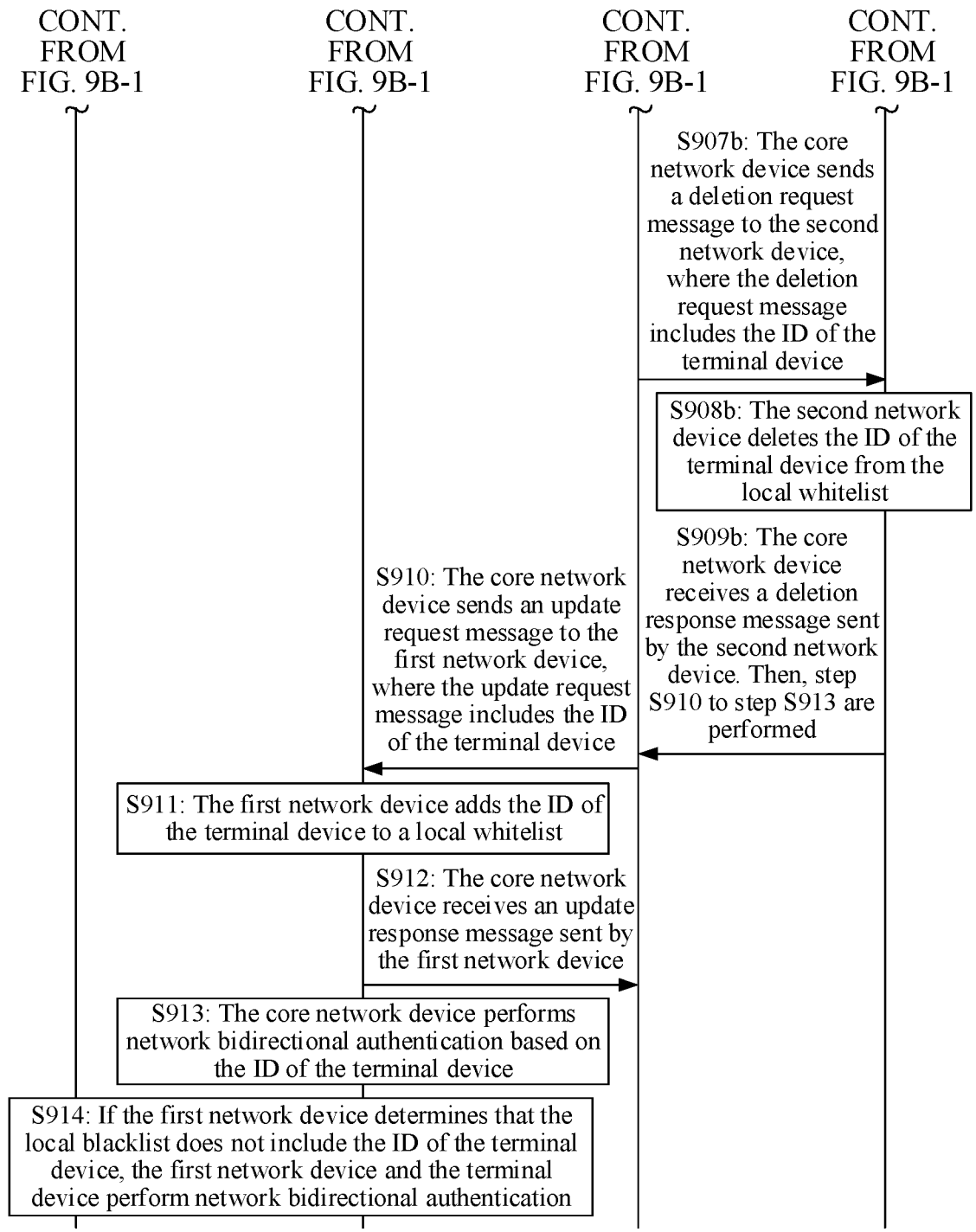

Specifically, FIG. 7 is an interaction flowchart of a network authentication method according to an embodiment of this application. As shown in FIG. 7, the method includes the following steps.

Step S701: A first network device receives an access request message sent by a terminal device, where the access request message includes an identity (ID) of the terminal device.

The ID of the terminal device may be a media access control (MAC) address, an internet protocol (IP) address, a mobile phone number, an international mobile equipment identity (IMEI), an international mobile subscriber identity (IMSI), an IP multimedia private identity (IMPI), a temporary mobile subscriber identity (TMSI), an IP multimedia public identity (IMPU), a globally unique temporary UE identity (GUTI), or the like. Any identity that can uniquely identify the terminal device can serve as the ID of the terminal device. This is not limited in this application.

Step S702: The first network device determines, based on the ID of the terminal device, whether to allow authentication on the terminal device.

In an optional manner, the first network device or the network system classifies all terminal devices into an IoT device or a non-IoT device. The IoT device may be a terminal device that may be connected to the IoT, such as a computer, a mobile phone, a printer, a refrigerator, a robot, a sensor, an electricity meter, or a water meter. It is specified that the IoT device is a terminal device that allows authentication by the first network device. It is specified that the non-IoT device is a terminal device that does not allow authentication by the first network device. Each terminal device has a unique ID. The first network device may determine, based on the ID of the terminal device, whether the terminal device is a terminal device that allows the authentication.

Certainly, the terminal device may alternatively be classified in another manner based on an ID of the terminal device. This is not limited in this application.

In another optional manner, if a local whitelist of the first network device includes the ID of the terminal device, it indicates that the first network device allows the authentication on the terminal device. Otherwise, it indicates that the first network device does not allow the authentication on the terminal device.

Step S703: If the first network device does not allow the authentication on the terminal device, the first network device sends the ID of the terminal device to a core network device.

Step S704: The core network device performs network authentication based on the ID of the terminal device.

Figure 1:
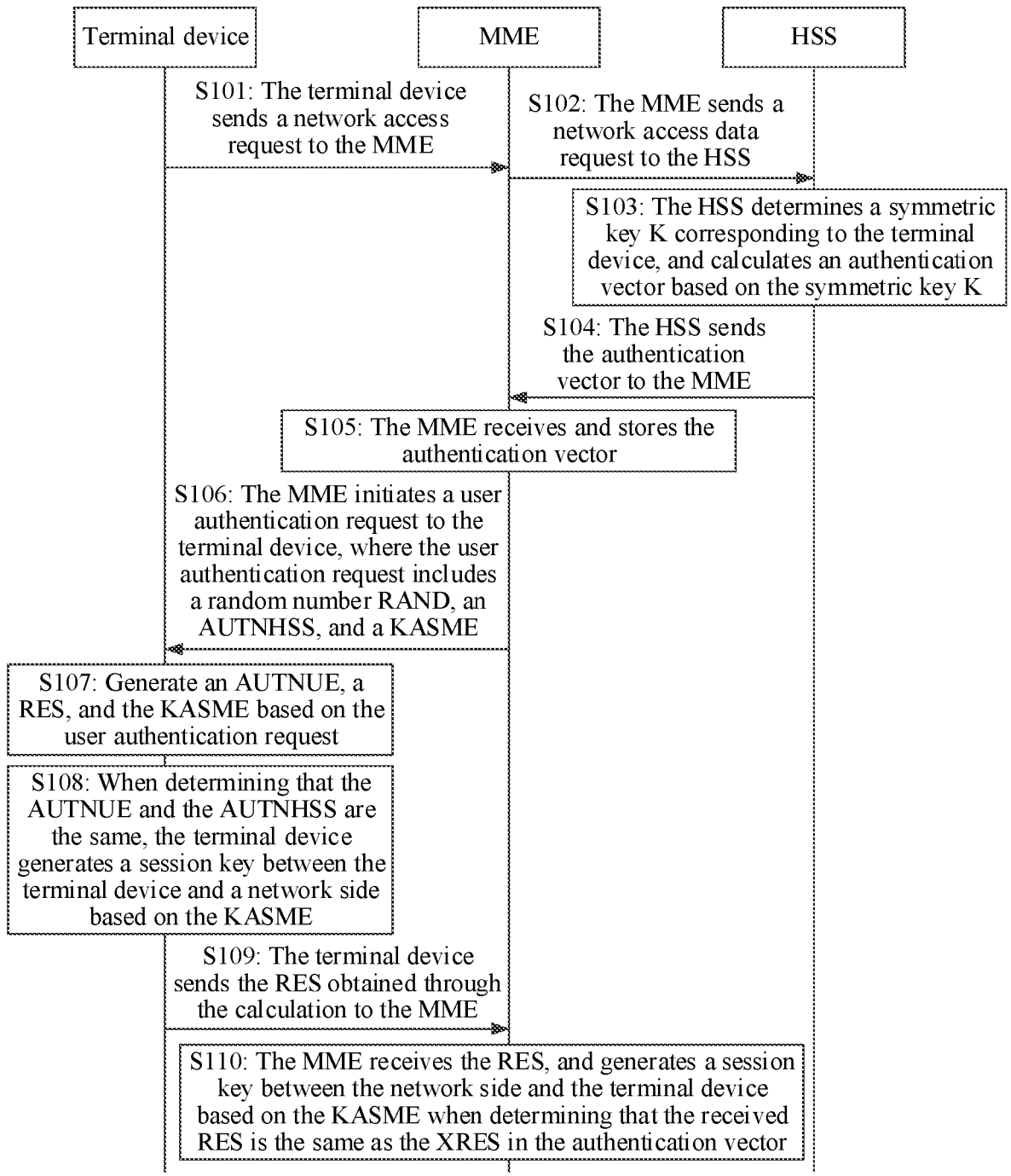
FIG. 1 is a schematic interaction diagram of network authentication performed by a terminal device in the prior art.

Description is made with reference to step S703 and step S704. When the core network device is an HSS, a network authentication process between the HSS and the terminal device may be the network authentication process shown in FIG. 1. When the core network device is an AUC server or an ARPF server, a network authentication process similar to that shown in FIG. 1 may be used. In conclusion, the core network device may use any network authentication method of an existing EPS-AKA authentication protocol. This is not limited in this application.

Step S705: If the first network device allows the authentication on the terminal device, the first network device sends an authentication request message to the terminal device. The terminal device performs authentication on the first network device based on the authentication request message. The first network device receives an authentication response message sent by the terminal device and performs authentication on the terminal device based on the authentication response message. In other words, if the first network device allows the authentication on the terminal device, the first network device and the terminal device perform network authentication.

The network authentication process between the first network device and the terminal device in this application may use any network authentication method of the existing EPS-AKA authentication protocol. This is not limited in this application. For example, the following network authentication method may be used. In an embodiment, the first network device may generate a symmetric key on a network device side based on an ID of the terminal device and a first key of the network device. In an embodiment, the first network device generates a first sequence number for the terminal device. In an embodiment, the first network device determines a correct sequence number of the terminal device based on the first sequence number. In an embodiment, the first network device generates a first authentication token based on the symmetric key, the correct sequence number, a first random number on the network device side, and an authentication management domain parameter configured by the first network device for the terminal device. The authentication management domain parameter is used to limit a parameter in a network authentication process of the terminal device. The first network device sends an authentication request message to the terminal device, where the authentication request message includes the first random number and the first authentication token, so that the terminal device performs authentication on the first network device based on the first authentication token and a second authentication token. The second authentication token is generated by the terminal device based on a symmetric key on a terminal device side, the first random number, the correct sequence number, and the authentication management domain parameter. The first network device receives an authentication response message sent by the terminal device, where the authentication response message includes a first authentication parameter. The first authentication parameter is generated based on the first random number and the symmetric key on the terminal device side. The first network device generates a second authentication parameter based on a symmetric key on a network device side and the first random number. The first network device performs authentication on the terminal device based on the first authentication parameter and the second authentication parameter.

It should be noted that the symmetric key on the network device side may be a symmetric key that has been stored in the first network device. In other words, that the first network device generates the symmetric key on the network device side may be omitted.

The first key is a private key of the first network device. Alternatively, the first key is a public key corresponding to a plurality of terminal devices that include the terminal device. Based on this, the symmetric key may be generated in the following two manners.

In an optional manner, the first key is a private key of the first network device. A based IBC includes an identity-based signature (IBS) technology and an identity-based encryption (IBE) technology. The terminal device and the first network device each have a private-public key pair. A public key is a meaningful character string (identity), such as an email address or a telephone number. A private key is generated by a private key generator (PKG) based on an ID of a device and a master private key of the PKG. A symmetric key K of the first network side device is generated by using the private key of the network side device and the ID of the terminal device. Likewise, a symmetric key K of the terminal device is generated by using a private key of the terminal device and an ID of the first network device. To generate the symmetric key K based on the private key of a local end and the ID of a peer end, pairing that is based on the prior art may be used, or an IBS cryptography technology that is based on RFC6507 and an algorithm such as static Diffie-Helleman performed by the IBS cryptography technology on an elliptic curve group may be used. This is not limited in this application.

In another optional manner, the first key is a public key corresponding to a plurality of terminal devices that include the terminal device. The first network device may derive the symmetric key K on the network device side based on the public key and the ID of the terminal device. It should be emphasized that the first network device may establish a network authentication relationship with a plurality of terminal devices. However, for each terminal device, the network device side has a unique corresponding symmetric key K. Therefore, a symmetric key derived by the first network device based on the public key and an ID of a terminal device A is a symmetric key K that is on the network device side and that is between the terminal device A and the first network device. The symmetric key K may be generated based on the public key and an ID of a peer end by using a related algorithm in the prior art. This is not limited in this application.

The first sequence number is a sequence number generated by the first network device based on current time information. In this case, the first sequence number is the same as a correct sequence number. Alternatively, the first sequence number is a pseudo sequence number of the terminal device.

In conclusion, in a case in which both the network device and the core network device have a network authentication function, this application provides a network authentication method, and a problem of how to perform network authentication can be effectively resolved by using the method. Further, the terminal device is enabled to perform network authentication with a proximate device as much as possible by using this method. For example, an access network gateway, a base station, and an MME-AU are all disposed in an access network, and compared with the core network device, the access network gateway, the base station, and the MME-AU may be referred to as proximate devices of the terminal device. Although an AUSF is disposed in a core network, it is considered that compared with core network devices such as an HSS, an AUC server, and an ARPF server, the AUSF is disposed more dispersedly. Therefore, compared with the core network devices such as the HSS, the AUC server, and the ARPF server, the AUSF may also be referred to as a proximate device of the terminal device. In conclusion, the terminal device is enabled to perform network authentication with a proximate device as much as possible by using this method, so that network authentication efficiency can be improved while reliability of network authentication (the network authentication is performed by using a network device or a core network device) is ensured.

On a basis of the embodiment corresponding to FIG. 7, for example, step S701 includes: determining, by the first network device based on the ID of the terminal device, whether the terminal device is an IoT device. Further, optionally, if the first network device allows the authentication on the terminal device, before the sending, by the first network device, an authentication request message to the terminal device, the method further includes: determining, by the first network device, whether a local blacklist includes the ID of the terminal device; and correspondingly, the sending, by the first network device, an authentication request message to the terminal device includes: if the first network device determines that the local blacklist does not include the ID of the terminal device, sending, by the first network device, the authentication request message to the terminal device.

Optionally, after the performing authentication on the terminal device based on the authentication response message, the method further includes: determining, by the first network device, whether a local whitelist includes the identity of the terminal device; and if the first network device determines that the local whitelist does not include the identity of the terminal device, sending, by the first network device, the identity of the terminal device to the core network device, so that the core network device verifies validity of the identity of the terminal device.

For example, that a core network verifies the validity of the ID of the terminal includes: If the global whitelist includes the ID of the terminal device, it indicates that the ID of the terminal device is valid. If the global whitelist does not include the ID of the terminal device, the core network device determines whether a length of the ID of the terminal device is within a preset range. If the length of the ID of the terminal device is within the preset range, it is determined that the ID of the terminal device is valid. Otherwise, it is determined that the ID of the terminal device is invalid. Actually, the core network device may use any verification method provided in the prior art to verify the validity of the ID of the terminal device. This is not limited in this application.

Optionally, before the sending, by the core network device, an authentication request message to the terminal device based on the ID of the terminal device, or before the core network device and the terminal device perform network authentication, the method further includes: determining, by the core network device, whether the identity of the terminal device is in a global whitelist; if the core network device determines that the identity of the terminal device is not in the global whitelist, verifying, by the core network device, validity of the identity of the terminal device; and correspondingly, the sending, by the core network device, an authentication request message to the terminal device based on the identity of the terminal device includes: when the identity of the terminal device is in the global whitelist or the identity of the terminal device is valid, sending, by the core network device, the authentication request message to the terminal device based on the identity of the terminal device.

To be specific, when the ID of the terminal device is in the global whitelist, it indicates that the ID of the terminal device is already valid, and therefore it is unnecessary to determine whether the ID of the terminal device is valid. Based on this, when the ID of the terminal device is in the global whitelist or the ID of the terminal device is valid, the core network device sends the authentication request message to the terminal device based on the ID of the terminal device.

The verifying, by the core network device, validity of the ID of the terminal device includes: determining, by the core network device, whether a length of the ID of the terminal device is within a preset range, and if the length of the ID of the terminal device is within the preset range, determining that the ID of the terminal device is valid; otherwise, determining that the ID of the terminal device is invalid. Actually, the core network device may use any verification method provided in the prior art to verify the validity of the ID of the terminal device. This is not limited in this application.

Optionally, the method further includes: if the ID of the terminal device is valid, storing, by the core network device, a correspondence between the terminal device and the first network device in the global whitelist; sending, by the core network device, an update request message to the first network device, where the update request message includes the identity of the terminal device, so that the first network device adds the ID of the terminal device to a local whitelist; and receiving, by the core network device, an update response message sent by the first network device.

Specifically, if that the identity of the terminal device is valid indicates a case in which the identity of the terminal device is not in the global whitelist but is valid, the core network device stores a correspondence between the terminal device and the first network device in the global whitelist. Specifically, a correspondence between the ID of the terminal device and the ID of the first network device may be stored. The ID of the terminal device is sent to the first network device, so that the first network device adds the ID of the terminal device to a local whitelist. In this way, the terminal device may perform network authentication with the first network device next time, and does not need to perform network authentication with the core network device.

Further, when the first network device successfully adds the ID of the terminal device, the update response message sent by the first network device to the core network device is used to indicate that the ID of the terminal device is successfully added. Otherwise, the update response message is used to indicate that the ID of the terminal device fails to be added.

Optionally, the method further includes: if the core network device determines that the identity of the terminal device is in the global whitelist, determining, by the core network device in the global whitelist, an ID of a second network device corresponding to the ID of the terminal device; sending, by the core network device, a deletion request message to the second network device, where the deletion request message includes the ID of the terminal device, so that the second network device deletes the ID of the terminal device from a local whitelist; receiving, by the core network device, a deletion response message sent by the second network device; updating, by the core network device, a correspondence that is between the terminal device and the second network device and that is in the global whitelist to a correspondence between the terminal device and the first network device; sending, by the core network device, an update request message to the first network device, where the update request message includes the ID of the terminal device, so that the first network device adds the ID of the terminal device to the local whitelist; and receiving, by the core network device, an update response message sent by the first network device.

Specifically, if the core network device determines that the ID of the terminal device is in the global whitelist, and previously has determined that the ID of the terminal device is not in the local whitelist of the first network device, it indicates that the global whitelist stores a correspondence between the ID of the terminal device and the ID of the second network device. Therefore, the core network device determines, in the global whitelist, the ID of the second network device corresponding to the ID of the terminal device. The core network device sends the deletion request message to the second network device, so that the second network device deletes the ID of the terminal device from the local whitelist. The core network device updates a correspondence that is between the terminal device and the second network device and that is in the global whitelist to the correspondence between the terminal device and the first network device. The core network device sends an update request message to the first network device, so that the first network device adds the ID of the terminal device to the local whitelist. In this way, the terminal device may perform network authentication with the first network device next time, and does not need to perform network authentication with the core network device.

With reference to the foregoing optional manner and the embodiment corresponding to FIG. 7, FIG. 8A-1 and FIG. 8A-2 and FIG. 8B-1 and FIG. 8B-2 are interaction flowcharts of a network authentication method according to another embodiment of this application. As shown in FIG. 8A-1 and FIG. 8A-2 and FIG. 8B-1 and FIG. 8B-2, the method includes the following steps.

Step S801: A first network device receives an access request message sent by a terminal device. The access request message includes an ID of the terminal device.

Step S802: The first network device determines, based on the ID of the terminal device, whether to allow authentication on the terminal device.

For example, the first network device or the network system classifies all terminal devices into an IoT device and a non-IoT device. The IoT device may be a terminal device that may be connected to the IoT such as a computer, a mobile phone, a printer, a refrigerator, a robot, a sensor, an electricity meter, or a water meter. It is specified that the IoT device is a terminal device that allows the authentication by the first network device. It is specified that the non-IoT device is a terminal device that does not allow the authentication by the first network device. Each terminal device has a unique ID. The first network device may determine, based on the ID of the terminal device, whether the terminal device is a terminal device that allows the authentication.

Step S803: If the first network device determines to allow the authentication on the terminal device, the first network device determines whether a local blacklist includes the ID of the terminal device.

Step S804: If the first network device determines that the local blacklist does not include the ID of the terminal device, the first network device sends an authentication request message to the terminal device, so that the terminal device performs authentication on the first network device based on the authentication request message. The first network device receives an authentication response message sent by the terminal device and performs authentication on the terminal device based on the authentication response message. In other words, if the first network device determines that the local blacklist does not include the ID of the terminal device, the first network device and the terminal device perform network authentication.

Step S805: The first network device determines whether the local whitelist includes the ID of the terminal device.

Step S806: If the first network device determines that the local whitelist does not include the ID of the terminal device, the first network device sends the ID of the terminal device to a core network device.

Step S807: The core network device determines whether the ID of the terminal device is in a global whitelist. If the core network device determines that the ID of the terminal device is not in the global whitelist, steps S808a to S809a are performed. If the core network device determines that the ID of the terminal device is in the global whitelist, steps S808b to S811b are performed.

Step S808a: The core network device verifies validity of the identity of the terminal device. When the ID of the terminal device is valid, step S809a is performed.

Step S809a: The core network device stores a correspondence between the terminal device and the first network device in the global whitelist. Then, step S812 to step S814 are performed.

Step S808b: The core network device updates a correspondence that is between the terminal device and a second network device and that is in the global whitelist to a correspondence between the terminal device and the first network device.

Step S809b: The core network device sends a deletion request message to the second network device, where the deletion request message includes the ID of the terminal device.

Step S810b: The second network device deletes the ID of the terminal device from the local whitelist.

Step S811b: The core network device receives a deletion response message sent by the second network device. Then, step S812 to step S814 are performed.

Step S812: The core network device sends an update request message to the first network device, where the update request message includes the ID of the terminal device.

Step S813: The first network device adds the ID of the terminal device to a local whitelist.

Step S814: The core network device receives an update response message sent by the first network device.

It should be noted that this application does not limit a sequence of the foregoing steps, and a sequence before the foregoing steps may be further adjusted. For example, Step S808b may be performed after any one of step S809 to step S814.

The foregoing steps are the same as some steps corresponding to FIG. 7 and the foregoing optional manners. Corresponding content and effects are not described herein again.

On a basis of the embodiment corresponding to FIG. 7, step S701 includes determining, by the first network device, whether the local whitelist includes the ID of the terminal device. Further, optionally, before the determining, by the first network device, whether the local whitelist includes the ID of the terminal device, the method further includes: determining, by the first network device, whether a local blacklist includes the ID of the terminal device; and correspondingly, the determining, by the first network device, whether the local whitelist includes the ID of the terminal device includes: if the first network device determines that the local blacklist does not include the ID of the terminal device, determining, by the first network device, whether the local whitelist includes the ID of the terminal device.

Optionally, before the sending, by the core network device, an authentication request message to the terminal device based on the ID of the terminal device, or before the core network device and the terminal device perform network authentication, the method further includes: determining, by the core network device, whether the identity of the terminal device is in a global whitelist; if the core network device determines that the identity of the terminal device is not in the global whitelist, verifying, by the core network device, validity of the identity of the terminal device; and correspondingly, the sending, by the core network device, an authentication request message to the terminal device based on the identity of the terminal device includes: when the identity of the terminal device is in the global whitelist or the identity of the terminal device is valid, sending, by the core network device, the authentication request message to the terminal device based on the identity of the terminal device.

To be specific, when the ID of the terminal device is in the global whitelist, it indicates that the ID of the terminal device is already valid, and therefore it is unnecessary to determine whether the ID of the terminal device is valid. Based on this, when the ID of the terminal device is in the global whitelist or the ID of the terminal device is valid, the core network device sends the authentication request message to the terminal device based on the ID of the terminal device.

The verifying, by the core network device, validity of the ID of the terminal device includes: determining, by the core network device, whether a length of the ID of the terminal device is within a preset range, and if the length of the ID of the terminal device is within the preset range, determining that the ID of the terminal device is valid; otherwise, determining that the ID of the terminal device is invalid. Actually, the core network device may use any verification method provided in the prior art to verify the validity of the ID of the terminal device. This is not limited in this application.

Optionally, the method further includes: if the ID of the terminal device is valid, storing, by the core network device, a correspondence between the terminal device and the first network device in the global whitelist; sending, by the core network device, an update request message to the first network device, where the update request message includes the identity of the terminal device, so that the first network device adds the ID of the terminal device to a local whitelist; and receiving, by the core network device, an update response message sent by the first network device.

Specifically, if that the identity of the terminal device is valid indicates a case in which the identity of the terminal device is not in the global whitelist but is valid, the core network device stores a correspondence between the terminal device and the first network device in the global whitelist. Specifically, a correspondence between the ID of the terminal device and the ID of the first network device may be stored. The ID of the terminal device is sent to the first network device, so that the first network device adds the ID of the terminal device to a local whitelist. In this way, the terminal device may perform network authentication with the first network device next time, and does not need to perform network authentication with the core network device.

Further, when the first network device successfully adds the ID of the terminal device, the update response message sent by the first network device to the core network device is used to indicate that the ID of the terminal device is successfully added. Otherwise, the update response message is used to indicate that the ID of the terminal device fails to be added.

Optionally, the method further includes: if the core network device determines that the identity of the terminal device is in the global whitelist, determining, by the core network device in the global whitelist, an ID of a second network device corresponding to the ID of the terminal device; sending, by the core network device, a deletion request message to the second network device, where the deletion request message includes the ID of the terminal device, so that the second network device deletes the ID of the terminal device from a local whitelist; receiving, by the core network device, a deletion response message sent by the second network device; updating, by the core network device, a correspondence that is between the terminal device and the second network device and that is in the global whitelist to a correspondence between the terminal device and the first network device; sending, by the core network device, an update request message to the first network device, where the update request message includes the ID of the terminal device, so that the first network device adds the ID of the terminal device to the local whitelist; and receiving, by the core network device, an update response message sent by the first network device.

Specifically, if the core network device determines that the ID of the terminal device is in the global whitelist, and previously has determined that the ID of the terminal device is not in the local whitelist of the first network device, it indicates that the global whitelist stores a correspondence between the ID of the terminal device and the ID of the second network device. Therefore, the core network device determines, in the global whitelist, the ID of the second network device corresponding to the ID of the terminal device. The core network device sends the deletion request message to the second network device, so that the second network device deletes the ID of the terminal device from the local whitelist. The core network device updates a correspondence that is between the terminal device and the second network device and that is in the global whitelist to the correspondence between the terminal device and the first network device. The core network device sends an update request message to the first network device, so that the first network device adds the ID of the terminal device to the local whitelist. In this way, the terminal device may perform network authentication with the first network device next time, and does not need to perform network authentication with the core network device.

With reference to the foregoing optional manner and the embodiment corresponding to FIG. 7, FIG. 9A-1 and FIG. 9A-2 and FIG. 9B-1 and FIG. 9B-2 are interaction flowcharts of a network authentication method according to another embodiment of this application. As shown in FIG. 9A-1 and FIG. 9A-2 and FIG. 9B-1 and FIG. 9B-2, the method includes the following steps.

Step S901: A first network device receives an access request message sent by a terminal device. The access request message includes an ID of the terminal device.

Step S902: The first network device determines whether a local blacklist includes the ID of the terminal device.

Step S903: If the first network device determines that the local blacklist does not include the ID of the terminal device, the first network device determines whether a local whitelist includes the ID of the terminal device.

Step S904: If the first network device determines that the local whitelist does not include the ID of the terminal device, the first network device sends the ID of the terminal device to a core network device.

Step S905: The core network device determines whether the ID of the terminal device is in a global whitelist. If the core network device determines that the ID of the terminal device is not in the global whitelist, step S906a to step S907a are performed. If the core network device determines that the ID of the terminal device is in the global whitelist, steps S906b to S909b are performed.

Step S906a: The core network device verifies validity of the identity of the terminal device. When the ID of the terminal device is valid, step S907a is performed.

Step S907a: The core network device stores a correspondence between the terminal device and the first network device in the global whitelist. Then, step S910 to step S913 are performed.

Step S906b: The core network device updates a correspondence that is between the terminal device and a second network device and that is in the global whitelist to a correspondence between the terminal device and the first network device.

Step S907b: The core network device sends a deletion request message to the second network device, where the deletion request message includes the ID of the terminal device.

Step S908b: The second network device deletes the ID of the terminal device from the local whitelist.

Step S909b: The core network device receives a deletion response message sent by the second network device. Then, step S910 to step S913 are performed.

Step S910: The core network device sends an update request message to the first network device, where the update request message includes the ID of the terminal device.

Step S911: The first network device adds the ID of the terminal device to a local whitelist.

Step S912: The core network device receives an update response message sent by the first network device.

Step S913: The core network device performs network authentication based on the ID of the terminal device.

Step S914: If the first network device determines that the local whitelist includes the ID of the terminal device, the first network device sends an authentication request message to the terminal device. Therefore, the terminal device performs authentication on the first network device based on the authentication request message. The first network device receives an authentication response message sent by the terminal device. The first network device performs authentication on the terminal device based on the authentication response message. In other words, if the first network device determines that the local blacklist does not include the ID of the terminal device, the first network device and the terminal device perform network authentication.

It should be noted that this application does not limit a sequence of the foregoing steps, and a sequence before the foregoing steps may be further adjusted. For example, Step S906b may be performed after any one of step S907b to step S913.

The foregoing steps are the same as some steps corresponding to FIG. 7 and the foregoing optional manners. Corresponding content and effects are not described herein again.

It should be noted that a difference between this embodiment and the foregoing embodiment lies in that in the foregoing embodiment, the first network device determines whether the terminal device is an IoT device, to determine whether to allow authentication by the first network device. When the first network device can be performed authentication, the network authentication is first performed by the terminal device, and then it is determined whether the local whitelist includes the ID of the terminal device. When the local whitelist does not include the ID of the terminal device, the ID is sent to the core network device, so that the core network device verifies validity of the ID. However, in this embodiment, whether the local whitelist includes the ID of the terminal device is first determined. If the local whitelist includes the ID of the terminal device, the first network device and the terminal device first perform network authentication. Otherwise, the ID of the terminal device is sent to the core network device, so that the core network device and the terminal device perform network authentication. Therefore, when the local whitelist includes a huge quantity of IDs of terminal devices, the method in the foregoing embodiment may be used. When the local whitelist includes a small quantity of IDs of terminal devices, the method in this embodiment may be used. Therefore, overheads of the first network device are reduced.

Optionally, when the first network device is an access network gateway, after the sending, by the first network device, an access response message to the terminal device, the method further includes: sending, by the first network device, a security mode command (Security Mode Command) to the terminal device; receiving, by the first network device, a security mode complete command sent by the terminal device; sending, by the first network device, an access security management key to the core network device and a base station that is connected to the terminal device; and sending, by the first network device, an attach accept (Attach Accept) message to the terminal device.

In the prior art, non-access stratum (Non-access Stratum, NAS) security is established between the MME and the terminal device by using a security mode command. However, in this application, because the first network device may perform network authentication, the NAS security may be established between the first network device and the terminal device by using the security mode command. Similarly, in the prior art, the MME sends the attach accept message to the terminal device, and in this application, the first network device sends the attach accept message to the terminal device.

It should be noted that, when the network authentication is implemented between the first network device and the terminal device, the first network device sends an access security management key (KASME) to the core network device and the base station that is connected to the terminal device, so that the base station and the core network device generate a session key between a network side and the terminal device based on the KASME.

Figure 10:
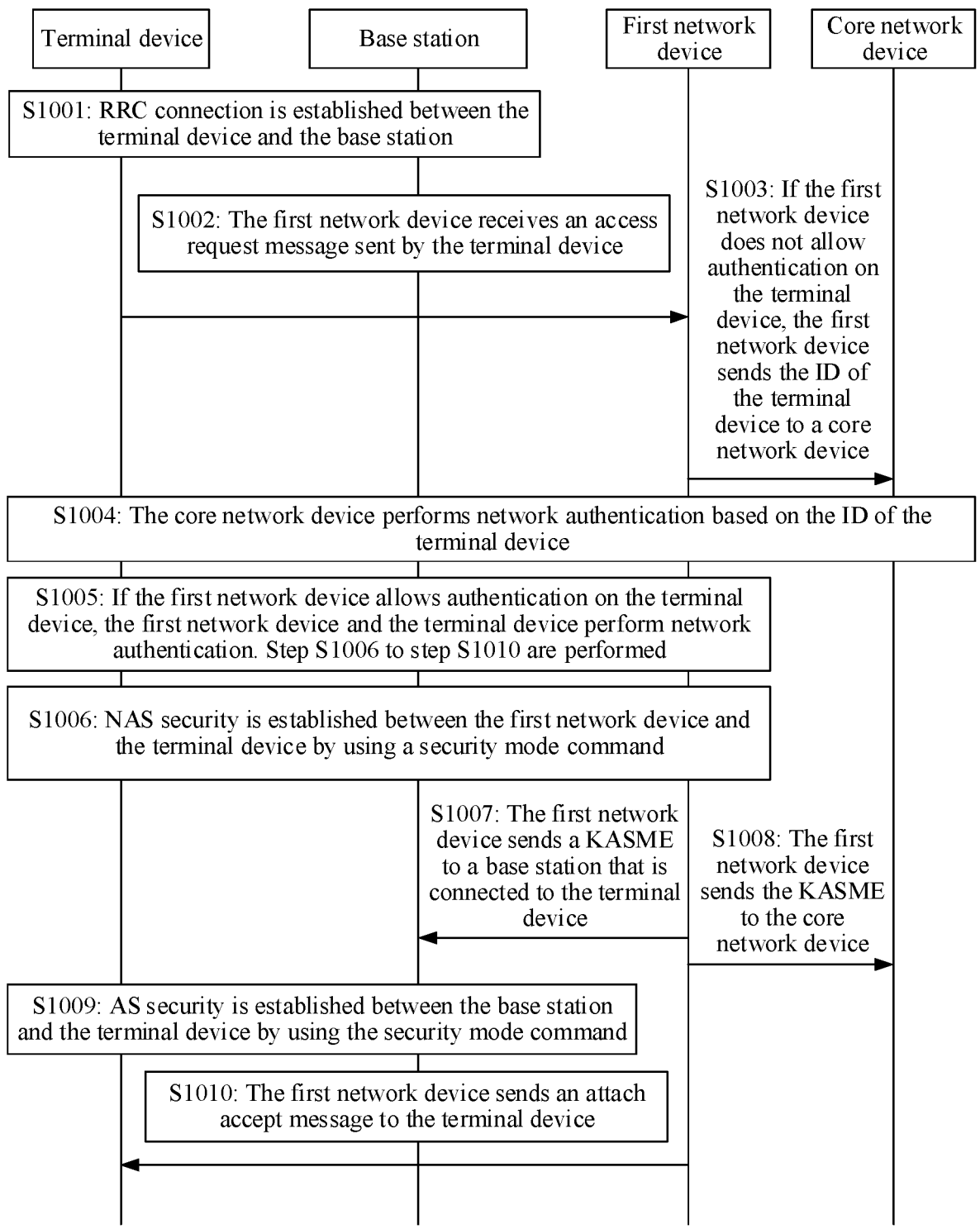
FIG. 10 is an interaction flowchart of a network authentication method according to yet another embodiment of this application.

Specifically, an example is used with reference to the optional manner and the embodiment corresponding to FIG. 7 for description. FIG. 10 is an interaction flowchart of a network authentication method according to yet another embodiment of this application. As shown in FIG. 10, the method includes the following steps.

Step S1001: A radio resource control (RRC) connection is established between a terminal device and a base station.

Step S1002: A first network device receives an access request message sent by the terminal device.

Step S1003: If the first network device does not allow authentication on the terminal device, the first network device sends the ID of the terminal device to the core network device.

Step S1004: The core network device performs network authentication based on the ID of the terminal device.

Step S1005: If the first network device allows authentication on the terminal device, the first network device sends an authentication request message to the terminal device. The terminal device performs authentication on the first network device based on the authentication request message. The first network device receives an authentication response message sent by the terminal device and performs authentication on the terminal device based on the authentication response message. In other words, if the first network device allows the authentication on the terminal device, the first network device and the terminal device perform network authentication. Step S1006 to step S1010 are performed.

Step S1006: NAS security is established between the first network device and the terminal device by using a security mode command.

Step S1007: The first network device sends a KASME to a base station that is connected to the terminal device.

Step S1008: The first network device sends the KASME to the core network device.

Step S1009: Access layer (AS) security is established between the base station and the terminal device by using the security mode command.

Step S1010: The first network device sends an attach accept message to the terminal device.

The foregoing steps are the same as some steps corresponding to FIG. 7 and the foregoing optional manners. Corresponding content and effects are not described herein again.

Optionally, when the first network device is the base station, after the sending, by the first network device, an access response message to the terminal device, the method further includes: sending, by the first network device, a KASME to the core network device.

It should be noted that, when the network authentication is implemented between the first network device and the terminal device, the first network device sends an access KASME to the terminal device and the core network device, so that the core network device generates a session key between a network side and the terminal device based on the KASME.

Optionally, when the first network device is an MME-AU or an AUSF, after the sending, by the first network device, an access response message to the terminal device, the method further includes: sending, by the first network device, the KASME to the core network device and a base station that is connected to the terminal device. Therefore, the base station and the core network device generate a session key between the network side and the terminal device based on the KASME.

Figure 11:
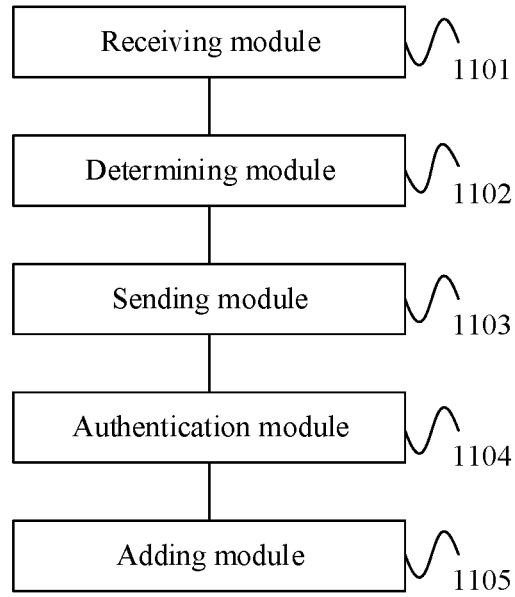
FIG. 11 is a schematic structural diagram of a network authentication apparatus according to an embodiment of this application.

FIG. 11 is a schematic structural diagram of a network authentication apparatus according to an embodiment of this application. As shown in FIG. 11, the network authentication apparatus includes: a receiving module 1101, a determining module 1102, a sending module 1103, an authentication module 1104, and an adding module 1105.

The receiving module 1101 is configured to receive an access request message sent by a terminal device, where the access request message includes an identity of the terminal device; the determining module 1102 is configured to determine, based on the identity of the terminal device, whether to allow authentication on the terminal device; the sending module 1103 is configured to: if the network device does not allow the authentication on the terminal device, send the identity of the terminal device to a core network device, so that the core network device performs network authentication based on the identity of the terminal device; and the sending module 1103 is further configured to: if the network device allows the authentication on the terminal device, send an authentication request message to the terminal device, so that the terminal device performs authentication on the network device based on the authentication request message; and the receiving module 1101 is further configured to receive an authentication response message sent by the terminal device. The authentication module 1104 is configured to perform authentication on the terminal device based on the authentication response message.

Optionally, the determining module 1102 is specifically configured to determine, based on the identity of the terminal device, whether the terminal device is an IoT device.

Optionally, the determining module 1102 is further configured to determine whether a local blacklist includes the identity of the terminal device; and correspondingly, the sending module 1103 is specifically configured to: if the determining module 1102 determines that the local blacklist does not include the identity of the terminal device, send an authentication request message to the terminal device.

Optionally, the determining module 1102 is further configured to determine whether a local whitelist includes the identity of the terminal device; and the sending module 1103 is further configured to: if the determining module 1102 determines that the local whitelist does not include the identity of the terminal device, send the identity of the terminal device to the core network device, so that the core network device verifies validity of the identity of the terminal device.

Optionally, the determining module 1102 is specifically configured to determine whether the local whitelist includes the identity of the terminal device.

Optionally, the determining module 1102 is further configured to determine whether a local blacklist includes the identity of the terminal device; and correspondingly, the determining module 1102 is specifically configured to: if it is determined that the local blacklist does not include the identity of the terminal device, determine whether the local whitelist includes the identity of the terminal device.

Optionally, when the network authentication apparatus is an access network gateway, the sending module 1103 is further configured to send a security mode command to the terminal device; the receiving module 1101 is further configured to receive a security mode complete command sent by the terminal device; the sending module 1103 is further configured to send an access security management key to the core network device and a base station that is connected to the terminal device; and the sending module 1103 is further configured to send an attach complete message to the terminal device.

Optionally, when the network authentication apparatus is a base station, the sending module 1103 is further configured to send the access security management key to the core network device.

Optionally, when the network authentication apparatus is a MME-AU or an AUSF, the sending module 1103 is further configured to send the access security management key to the core network device and a base station that is connected to the terminal device.

Optionally, the receiving module 1101 is further configured to receive an update request message sent by the core network device, where the update request message includes the identity of the terminal device; the adding module 1105 is further configured to add the identity of the terminal device to the local whitelist; and the sending module 1103 is further configured to send an update response message to the core network device.

This application provides a network authentication apparatus, and the network authentication apparatus may be configured to perform the method steps performed by the foregoing network device. Implementation principles and technical effects of the network authentication apparatus are similar, and details are not described herein again.

Figure 12:
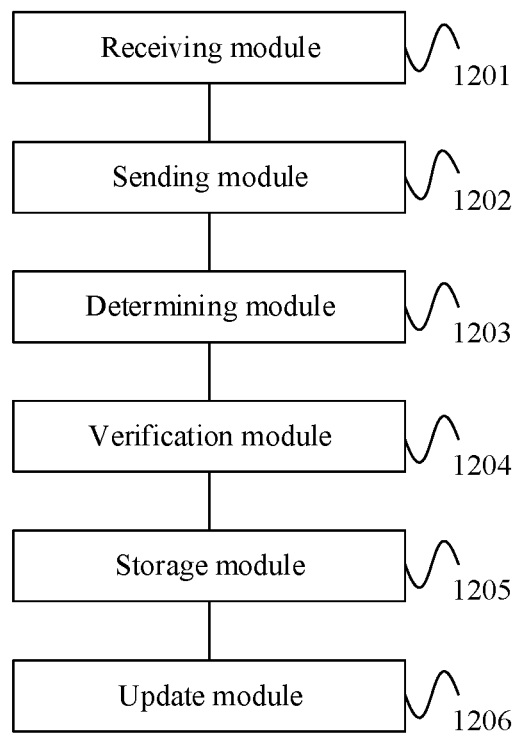
FIG. 12 is a schematic structural diagram of a network authentication apparatus according to an embodiment of this application.

FIG. 12 is a schematic structural diagram of a network authentication apparatus according to an embodiment of this application. As shown in FIG. 12, the network authentication apparatus includes: a receiving module 1201, a sending module 1202, a determining module 1203, a verification module 1204, a storage module 1205, and an update module 1206.

The receiving module 1201 is configured to receive an identity of a terminal device sent by a first network device; sending module 1202 is configured to send an authentication request message to the terminal device based on the identity of the terminal device, so that the terminal device performs authentication on the network authentication apparatus based on the authentication request message; and the receiving module 1201 is further configured to: receive an authentication response message sent by the terminal device and perform authentication on the terminal device based on the authentication response message.

Optionally, the determining module 1203 is configured to determine whether the identity of the terminal device is in a global whitelist; and if the determining module 1203 determines that the identity of the terminal device is not in the global whitelist, the verification module 1204 verifies validity of the identity of the terminal device; and correspondingly, the sending module 1202 is specifically configured to: when the identity of the terminal device is in the global whitelist or the identity of the terminal device is valid, send the authentication request message to the terminal device based on the identity of the terminal device.

Optionally, the storage module 1205 is further configured to: if the identity of the terminal device is valid, store a correspondence between the terminal device and the first network device in the global whitelist; the sending module 1202 is further configured to send an update request message to the first network device, where the update request message includes the identity of the terminal device, so that the first network device adds the identity of the terminal device to the local whitelist; and the receiving module 1201 is further configured to receive an update response message sent by the first network device.

Optionally, the determining module 1203 is further configured to: if it is determined that the identity of the terminal device is in the global whitelist, determine, in the global whitelist, an identity of a second network device corresponding to the identity of the terminal device; the sending module 1202 is further configured to send a deletion request message to the second network device, where the deletion request message includes the identity of the terminal device, so that the second network device deletes the identity of the terminal device from a local whitelist; the receiving module 1201 is further configured to receive a deletion response message sent by the second network device; the update module 1206 is further configured to update a correspondence that is between the terminal device and the second network device and that is in the global whitelist to a correspondence between the terminal device and the first network device; the sending module 1202 is further configured to send an update request message to the first network device, where the update request message includes the identity of the terminal device, so that the first network device adds the identity of the terminal device to the local whitelist; and the receiving module 1201 is further configured to receive an update response message sent by the first network device.

Optionally, the receiving module 1201 is further configured to receive an access security management key sent by the first network device.

This application provides a network authentication apparatus, and the network authentication apparatus may be configured to perform the method steps performed by the foregoing core network device. Implementation principles and technical effects of the network authentication apparatus are similar, and details are not described herein again.

Figure 13:
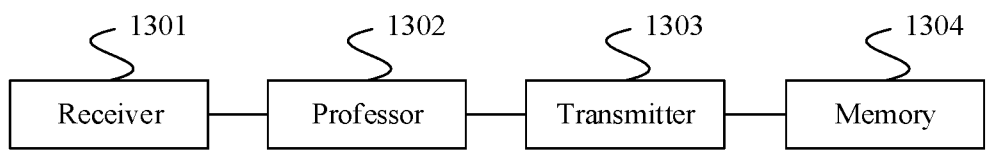
FIG. 13 is a schematic structural diagram of a network device according to an embodiment of this application.

FIG. 13 is a schematic structural diagram of a network device according to an embodiment of this application. As shown in FIG. 13, the network device includes: a receiver 1301, a processor 1302, a transmitter 1303, and a memory 1304.

The memory 1304 is configured to store code, and when the code is run by the processor 1302, the processor 1302 is enabled to implement the following function; the receiver 1301 is configured to receive an access request message sent by a terminal device, where the access request message includes an identity of the terminal device; the processor 1302 is configured to determine, based on the identity of the terminal device, whether to allow authentication on the terminal device; the transmitter 1303 is configured to: if the network device does not allow the authentication on the terminal device, send the identity of the terminal device to a core network device, so that the core network device performs network authentication based on the identity of the terminal device; and the transmitter 1303 is further configured to: if the network device allows the authentication on the terminal device, send an authentication request message to the terminal device, so that the terminal device performs authentication on the network device based on the authentication request message; the receiver 1301 is further configured to receive an authentication response message sent by the terminal device; and the processor 1302 is further configured to perform authentication on the terminal device based on the authentication response message.

Optionally, the processor 1302 is specifically configured to determine, based on the identity of the terminal device, whether the terminal device is an internet of things IoT device.

Optionally, the processor 1302 is further configured to determine whether a local blacklist includes the identity of the terminal device; and correspondingly, the transmitter 1303 is specifically configured to: if the processor 1302 determines that the local blacklist does not include the identity of the terminal device, send an authentication request message to the terminal device.

Optionally, the processor 1302 is further configured to determine whether a local whitelist includes the identity of the terminal device; and the transmitter 1303 is further configured to: if the processor 1302 determines that the local whitelist does not include the identity of the terminal device, send the identity of the terminal device to the core network device, so that the core network device verifies validity of the identity of the terminal device.

Optionally, the processor 1302 is specifically configured to determine whether the local whitelist includes the identity of the terminal device.

Optionally, the processor 1302 is further configured to determine whether a local blacklist includes the identity of the terminal device; and correspondingly, the processor 1302 is specifically configured to: if it is determined that the local blacklist does not include the identity of the terminal device, determine whether the local whitelist includes the identity of the terminal device.

Optionally, when the network device is an access network gateway, the transmitter 1303 is further configured to send a security mode command to the terminal device; the receiver 1301 is further configured to receive a security mode complete command sent by the terminal device; the transmitter 1303 is further configured to send an access security management key to the core network device and a base station that is connected to the terminal device; and the transmitter 1303 is further configured to send an attach complete message to the terminal device.

Optionally, when the network device is a base station, the transmitter 1303 is further configured to send the access security management key to the core network device.

Optionally, when the network device is a mobility management entity-authentication unit MME-AU or an authentication security unit AUSF, the transmitter 1303 is further configured to send the access security management key to the core network device and a base station that is connected to the terminal device.

Optionally, the receiver 1301 is further configured to receive an update request message sent by the core network device, where the update request message includes the identity of the terminal device; the processor 1302 is further configured to add the identity of the terminal device to the local whitelist; and the transmitter 1303 is further configured to send an update response message to the core network device.

This application provides a network device, and the network device may be configured to perform the method steps performed by the foregoing network device. Implementation principles and technical effects of the network device are similar, and details are not described herein again.

Figure 14:
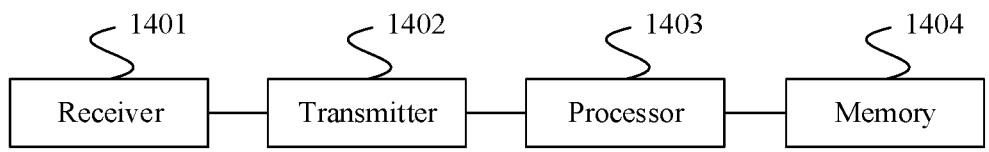
FIG. 14 is a schematic structural diagram of a core network device according to an embodiment of this application.

FIG. 14 is a schematic structural diagram of a core network device according to an embodiment of this application. As shown in FIG. 14, the core network device includes: a receiver 1401, a transmitter 1402, a processor 1403, and a memory 1404.

The receiver 1401 is configured to receive an identity of a terminal device sent by a first network device; a transmitter 1402 is configured to send an authentication request message to the terminal device based on the identity of the terminal device, so that the terminal device performs authentication on the core network device based on the authentication request message; and the receiver 1401 is further configured to: receive an authentication response message sent by the terminal device and perform authentication on the terminal device based on the authentication response message.

Optionally, the memory 1404 is configured to store code, and when the code is run by the processor 1403, the processor 1403 is enabled to: determine whether the identity of the terminal device is in a global whitelist; and if it is determined that the identity of the terminal device is not in the global whitelist, verify validity of the identity of the terminal device; and correspondingly, the transmitter 1402 is specifically configured to: when the identity of the terminal device is in the global whitelist or the identity of the terminal device is valid, send the authentication request message to the terminal device based on the identity of the terminal device.

Optionally, the processor 1403 is further configured to: if the identity of the terminal device is valid, store a correspondence between the terminal device and the first network device in the global whitelist; the transmitter 1402 is further configured to send an update request message to the first network device, where the update request message includes the identity of the terminal device, so that the first network device adds the identity of the terminal device to the local whitelist; and the receiver 1401 is further configured to receive an update response message sent by the first network device.

Optionally, the processor 1403 is further configured to: if it is determined that the identity of the terminal device is in the global whitelist, determine, in the global whitelist, an identity of a second network device corresponding to the identity of the terminal device; the transmitter 1402 is further configured to send a deletion request message to the second network device, where the deletion request message includes the identity of the terminal device, so that the second network device deletes the identity of the terminal device from a local whitelist; the receiver 1401 is further configured to receive a deletion response message sent by the second network device; the processor 1403 is further configured to update a correspondence that is between the terminal device and the second network device and that is in the global whitelist to a correspondence between the terminal device and the first network device; the transmitter 1402 is further configured to send an update request message to the first network device, where the update request message includes the identity of the terminal device, so that the first network device adds the identity of the terminal device to the local whitelist; and the receiver 1401 is further configured to receive an update response message sent by the first network device.

Optionally, the receiver 1401 is further configured to receive an access security management key sent by the first network device.

This application provides a core network device. The core network device may be configured to perform the method steps performed by the foregoing core network device. Implementation principles and technical effects of the core network device are similar, and details are not described herein again.

A person skilled in the art should understand that the embodiments of the present invention may be provided as a method, a system, or a computer program product. Therefore, the present invention may use a form of hardware only embodiments, software only embodiments, or embodiments with a combination of software and hardware. Moreover, the present invention may use a form of a computer program product that is implemented on one or more computer-usable storage mediums (including but not limited to a disk memory, an optical memory, and the like) that include computer-usable program code.

The present invention is described with reference to the flowcharts and/or block diagrams of the method, the device (system), and the computer program product in the embodiments of the present invention. It should be understood that computer program instructions may be used to implement each procedure and/or each block in the flowcharts and/or the block diagrams and a combination of a procedure and/or a block in the flowcharts and/or the block diagrams. These computer program instructions may be provided for a general-purpose computer, a dedicated computer, an embedded processor, or a processor of another programmable data processing device to generate a machine, so that the instructions executed by the computer or the processor of the another programmable data processing device generate an apparatus for implementing a specified function in one or more procedures in the flowcharts and/or in one or more blocks in the block diagrams.

These computer program instructions may be alternatively stored in a computer readable memory that can instruct a computer or another programmable data processing device to work in a specific manner, so that the instructions stored in the computer readable memory generate an artifact that includes an instruction apparatus. The instruction apparatus implements a specified function in one or more procedures in the flowcharts and/or in one or more blocks in the block diagrams.

These computer program instructions may be alternatively loaded onto a computer or another programmable data processing device, so that a series of operations and steps are performed on the computer or the another programmable device, thereby generating computer-implemented processing. Therefore, the instructions executed on the computer or the another programmable device provide steps for implementing a specified function in one or more procedures in the flowcharts and/or in one or more blocks in the block diagrams.

Obviously, a person skilled in the art can make various modifications and variations to the present invention without departing from the spirit and scope of the present invention. In this way, the present invention is intended to cover these modifications and variations provided that they fall within the scope of the claims of the present invention and their equivalent technologies.

What is claimed is:

1. A network authentication method, comprising:

receiving, by a first network device, a first access request message from a first terminal device, wherein the first access request message comprises an identity of the first terminal device;

determining, by the first network device based on the identity of the first terminal device, whether to allow authentication on the first terminal device by determining whether a local list stored on the first network device comprises the identity of the first terminal device;

responsive to determining that the first network device does not allow the authentication on the first terminal device, sending, by the first network device, the identity of the first terminal device to a core network device to request the core network device to perform network authentication on the first terminal device based on the identity of the first terminal device;

receiving, by the first network device, a second access request message from a second terminal device, wherein the second access request message comprises an identity of the second terminal device;

determining, by the first network device based on the identity of the second terminal device, whether to allow authentication on the second terminal device by determining whether the local list stored on the first network device comprises the identity of the second terminal device; and responsive to determining that the first network device allows the authentication on the second terminal device:

sending, by the first network device, an authentication request message to the second terminal device to request the second terminal device to perform authentication on the first network device based on the authentication request message;

receiving, by the first network device, an authentication response message from the second terminal device, wherein the authentication response message includes a first authentication parameter generated by the second terminal device based on the authentication request message; and performing, by the first network device, authentication on the second terminal device based on the first authentication parameter included in the authentication response message.

2. The method according to claim 1, wherein the determining, by the first network device based on the identity of the second terminal device, whether to allow authentication on the second terminal device comprises:

determining, by the first network device based on the identity of the second terminal device, whether the second terminal device is an internet of things (IoT) device.

3. The method according to claim 2, wherein before the sending, by the first network device, the authentication request message to the second terminal device, the method further comprises:

determining, by the first network device, whether a local blacklist comprises the identity of the second terminal device; and wherein the sending, by the first network device, the authentication request message to the second terminal device comprises:

responsive to determining that the local blacklist does not comprise the identity of the second terminal device, sending, by the first network device, the authentication request message to the second terminal device.

4. The method according to claim 3, wherein after the performing, by the first network device, authentication on the second terminal device based on the authentication response message, the method further comprises:

determining, by the first network device, whether a local whitelist comprises the identity of the second terminal device; and responsive to determining that the local whitelist does not comprise the identity of the second terminal device, sending, by the first network device, the identity of the second terminal device to the core network device to enable the core network device to verify a validity of the identity of the second terminal device.

5. The method according to claim 1, wherein the local list is a local whitelist, and wherein the determining, by the first network device based on the identity of the first terminal device, whether to allow authentication on the first terminal device comprises:

determining, by the first network device, whether the local whitelist comprises the identity of the first terminal device and responsive to determining that the local whitelist does not comprise the identity of the first terminal device, sending the identity of the first terminal device to the core network device.

6. The method according to claim 5, wherein before the determining, by the first network device, whether the local whitelist comprises the identity of the first terminal device, the method further comprises:

determining, by the first network device, whether a local blacklist comprises the identity of the first terminal device; and wherein the determining, by the first network device, whether the local whitelist comprises the identity of the first terminal device comprises:

responsive to determining that the local blacklist does not comprise the identity of the first terminal device, determining, by the first network device, whether the local whitelist comprises the identity of the first terminal device.

7. The method according to claim 1, wherein when the first network device is an access network gateway, after the performing, by the first network device, authentication on the second terminal device based on the authentication response message, the method further comprises:

sending, by the first network device, a security mode command to the second terminal device;

receiving, by the first network device, a security mode complete command from the second terminal device;

sending, by the first network device, an access security management key to the core network device and a base station that is connected to the second terminal device; and sending, by the first network device, an attach complete message to the second terminal device.

8. The method according to claim 1, wherein when the first network device is a base station, after the performing, by the first network device, authentication on the second terminal device based on the authentication response message, the method further comprises:

sending, by the first network device, an access security management key to the core network device.

9. A network device, comprising: a receiver, a processor, a transmitter, and a memory, wherein:

the memory is configured to store code that is run by the processor;

the receiver is configured to receive a first access request message from a first terminal device and a second access request message from a second terminal device, wherein the first access request message comprises an identity of the first terminal device and the second access request message comprises an identity of the second terminal device;

the processor is configured to determine, based on the identity of the first terminal device, whether to allow authentication on the first terminal device by determining whether a local list stored on the first network device comprises the identity of the first terminal device;

the processor is further configured to determine, based on the identity of the second terminal device, whether to allow authentication on the second terminal device by determining whether a local list stored on the first network device comprises the identity of the second terminal device;

the transmitter is configured to:
responsive to determining that the network device does not allow the authentication on the first terminal device:
send the identity of the first terminal device to a core network device to request the core network device to perform network authentication on the first terminal device based on the identity of the first terminal device;

the transmitter is further configured to:
responsive to determining that the network device allows the authentication on the second terminal device:
send an authentication request message to the second terminal device to request the second terminal device to perform authentication on the network device based on the authentication request message;

the receiver is further configured to receive an authentication response message from the second terminal device, wherein the authentication response message includes a first authentication parameter generated by the second terminal device based on the authentication request message; and the processor is further configured to perform authentication on the second terminal device based on the first authentication parameter included in the authentication response message.

10. The network device according to claim 9, wherein the processor is specifically configured to determine, based on the identity of the second terminal device, whether the second terminal device is an internet of things (IoT) device.

11. The network device according to claim 10, wherein the processor is further configured to determine whether a local blacklist comprises the identity of the second terminal device; and wherein the transmitter is specifically configured to:

responsive to the processor determining that the local blacklist does not comprise the identity of the second terminal device, send an authentication request message to the second terminal device.

12. The network device according to claim 11, wherein the processor is further configured to determine whether a local whitelist comprises the identity of the second terminal device; and the transmitter is further configured to:

responsive to the processor determining that the local whitelist does not comprise the identity of the second terminal device, send the identity of the second terminal device to the core network device to enable the core network device to verify a validity of the identity of the second terminal device.

13. The network device according to claim 9, wherein the local list is a local whitelist, and wherein the processor is specifically configured to determine whether the local whitelist comprises the identity of the first terminal device.

14. The network device according to claim 13, wherein the processor is further configured to determine whether a local blacklist comprises the identity of the first terminal device; and wherein the processor is specifically configured to:

responsive to determining that the local blacklist does not comprise the identity of the first terminal device, determine whether the local whitelist comprises the identity of the first terminal device.

15. The network device according to claim 9, wherein when the network device is an access network gateway:

the transmitter is further configured to send a security mode command to the second terminal device;

the receiver is further configured to receive a security mode complete command from the second terminal device;

the transmitter is further configured to send an access security management key to the core network device and a base station that is connected to the second terminal device; and the transmitter is further configured to send an attach complete message to the second terminal device.

* * * * *